(12) United States Patent
Gleason

(10) Patent No.: US 11,873,984 B1
(45) Date of Patent: Jan. 16, 2024

(54) PORTABLE LIGHT SOURCE FOR ALTERING AESTHETICS OF PHOTOCHROMATIC DYE-COATED OBJECTS

(71) Applicant: HUT ENTERPRISES LLC, Middletown, DE (US)

(72) Inventor: John Paul Gleason, Grosse Pointe, MI (US)

(73) Assignee: HUT ENTERPRISES LLC, Middletown, DE (US)

( * ) Notice: Subject to any disclaimer, the term of this patent is extended or adjusted under 35 U.S.C. 154(b) by 0 days.

(21) Appl. No.: 18/101,384

(22) Filed: Jan. 25, 2023

Related U.S. Application Data

(63) Continuation-in-part of application No. 17/539,197, filed on Dec. 1, 2021, now Pat. No. 11,585,524, which is a continuation of application No. 17/089,615, filed on Nov. 4, 2020, now Pat. No. 11,204,161.

(60) Provisional application No. 63/068,004, filed on Aug. 20, 2020, provisional application No. 63/048,832, filed on Jul. 7, 2020.

(51) Int. Cl.
| | |
|---|---|
| *F21V 33/00* | (2006.01) |
| *A45C 11/04* | (2006.01) |
| *F21V 19/00* | (2006.01) |
| *G02C 5/00* | (2006.01) |
| *H05B 47/10* | (2020.01) |

(52) U.S. Cl.
CPC .......... *F21V 33/0004* (2013.01); *A45C 11/04* (2013.01); *F21V 19/001* (2013.01); *G02C 5/008* (2013.01); *H05B 47/10* (2020.01)

(58) Field of Classification Search
CPC .... F21V 33/0004; F21V 19/001; F21V 33/00; F21V 99/00; F21V 15/00; F21V 15/01; H05B 47/10; H05B 47/00; H05B 47/155; H05B 47/105; A45C 11/04; A45C 11/00; A45C 11/36; G02C 5/008; G02C 5/00
See application file for complete search history.

(56) References Cited

U.S. PATENT DOCUMENTS

| | | | | |
|---|---|---|---|---|
| 5,440,354 | A | * | 8/1995 | Just .................... G02C 5/008 351/158 |
| 6,405,858 | B1 | * | 6/2002 | Gagliardi ............... A45C 11/16 84/94.2 |

(Continued)

*Primary Examiner* — Bao Q Truong
(74) *Attorney, Agent, or Firm* — Christopher P. Maiorana, PC

(57) ABSTRACT

An apparatus comprising a first light source, a second light source, a controller and a power source. The first light source may activate color channels of a reactive material in response to a signal. The second light source may deactivate a subset of the color channels of the reactive material in response to the signal. The controller may receive an input, determine characteristics for the light sources in response to the input and generate the signal in response to the first characteristics and the second characteristics. The power source may provide power for the light sources and the controller. The reactive material may change appearance in response to the subset of the color channels deactivated. The power source and the controller may be contained in a housing of the apparatus. The light sources may enable the apparatus to emit light onto an object comprising the reactive material.

20 Claims, 13 Drawing Sheets

(56) References Cited

U.S. PATENT DOCUMENTS

| | | | |
|---|---|---|---|
| 7,204,614 B2* | 4/2007 | Hanis | A47G 23/0309 |
| | | | 362/267 |
| 7,775,675 B2* | 8/2010 | Hamm | A45C 11/04 |
| | | | 362/276 |
| 8,622,540 B2* | 1/2014 | Burnstein | G02C 11/02 |
| | | | 351/52 |
| 10,072,837 B2* | 9/2018 | Hong | F21V 33/0004 |
| 11,204,161 B1* | 12/2021 | Gleason | F21V 19/001 |
| 11,585,524 B1* | 2/2023 | Gleason | F21V 33/0004 |
| 2012/0292205 A1* | 11/2012 | Waters | A45C 15/06 |
| | | | 206/216 |
| 2018/0298181 A1* | 10/2018 | Collini | C08L 33/12 |

\* cited by examiner

PORTABLE LIGHT SOURCE FOR ALTERING AESTHETICS OF PHOTOCHROMATIC DYE-COATED OBJECTS

This application relates to U.S. patent application Ser. No. 17/539,197, filed on Dec. 1, 2021, which relates to U.S. patent application Ser. No. 17/089,615, filed on Nov. 4, 2020, now U.S. Pat. No. 11,204,161, which relates to U.S. Provisional Application No. 63/068,004, filed on Aug. 20, 2020, and U.S. Provisional Application No. 63/048,832, filed on Jul. 7, 2020. Each of the mentioned applications are hereby incorporated by reference in its entirety.

FIELD OF THE INVENTION

The invention relates to fashion and technology accessories generally and, more particularly, to a method and/or apparatus for implementing a portable light source for altering aesthetics of photochromatic dye-coated objects.

BACKGROUND

Many products are targeted to a mass audience. In order to increase manufacturing efficiency, products having multiple designs or multiple colors are not always available. Often times, accessories are only made available in a single color (i.e., black), because the market for other colors might not be as large. In other circumstances, consumers might be willing to buy the same product multiple times in different colors for aesthetic purposes, but are less likely to buy an expensive product multiple times. Multiple options for colors can be prohibitively expensive, increases waste, and requires the product manufacturer to produce multiple different versions of the same product.

Conventional products lack the ability to change appearance based on the desire of the user. This inability to change style includes, but is not limited to, color, style and design. Consumers are effectively 'stuck' with the either a lack of options, or a design first selected. Both manufacturers and consumers can be limited to a fixed color/design. There is an inability to change the color/design of an accessory based on a desire of the user. The ability to change the appearance of the accessory may provide the consumer with enjoyment of the product.

While materials that change color are available, there are limitations in how the color change can be applied. The size and shape of objects can cause difficultly in the ability to users to apply a color change. Without a convenient option for users to change colors for their products, manufacturers will not start making products that are capable of changing color.

It would be desirable to implement a portable light source for altering aesthetics of photochromatic dye-coated objects.

SUMMARY

The invention concerns an apparatus comprising a first light source, a second light source, a controller and a power source. The first light source may be configured to activate color channels of a reactive material in response to a signal. The second light source may be configured to deactivate a subset of the color channels of the reactive material in response to the signal. The controller may be configured to receive an input, determine first characteristics for the first light source and second characteristics for the second light source in response to the input and generate the signal in response to the first characteristics and the second characteristics. The power source may be configured to provide power for the first light source, the second light source and the controller. The reactive material may be configured to change appearance in response to the subset of the color channels deactivated by the second light source. The power source and the controller may be contained in a housing of the apparatus. The first light source and the second light source may enable the apparatus to emit light onto an object comprising the reactive material.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
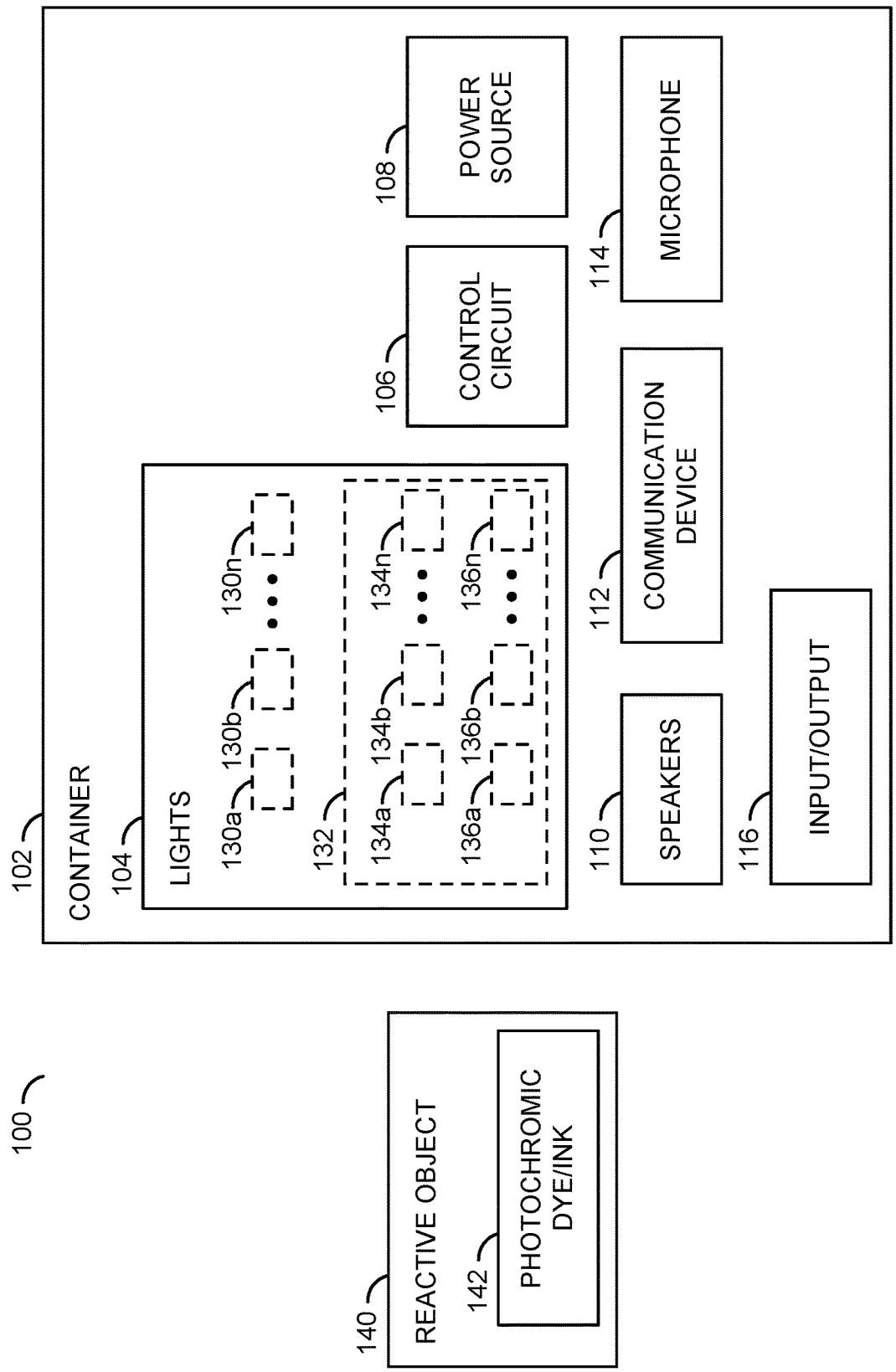
FIG. 1 is a diagram illustrating an example embodiment of the present invention.

Embodiments of the present invention include providing a portable light source for altering aesthetics of photochromatic dye-coated objects that may provide a color-changing dye/ink for various items, (ii) alter a color-changing dye/ink using lighting, (iii) provide a portable device that can move around an item with color-changing dye/ink to apply light, (iv) control lighting characteristics that affect how a reactive material changes appearance, (v) enable user input from a smartphone application, (vi) enable a color and/or pattern change for items having various shapes and sizes, (vii) enable light for changing an appearance of items to be applied to objects that may be too large to fit within a container, (viii) measure ambient light in an environment and automatically adjust the characteristics of light applied to an object to account for an effect of the ambient light, (ix) enable automation of a process for applying light at various angles of an object and/or (x) be implemented as one or more integrated circuits.

Embodiments of the present invention may be configured to enable an on-demand change of an appearance, design and/or color of an object. The on-demand change of appearance, design and/or color may be enabled using a color changing dye and/or ink. For example, the color changing dye and/or ink may comprise a photochromic material. The photochromic material may be configured to react (e.g., change color) in response to light. The type of object having the color changing dye and/or ink may be any type of object (e.g., a watch, earbuds, a pet collar, a pet harness, eyeglass frames, a guitar, a smartphone case, shoes, shoe laces, toys, figurines, etc.).

In one example, the embodiments of the present invention may be applied to frames that hold prescription and non-prescription lenses. For example, the appearance, design and/or color of eyeglass frames may be changes in response to light. In another example, the embodiments of the present invention may be applied to earbuds. The type of accessories implemented using the embodiments of the present invention may be varied according to the design criteria of a particular invention.

Embodiments of the present invention may be configured to enable a user to change an appearance of an object based of a desire of the user. In one example, the photochromic material may be incorporated into an item (e.g., in the shape of eyeglasses). The reactive material may be configured to change a physical appearance (e.g., a color, a pattern of colors, etc.). The change in appearance may comprise, but is not limited to, creating an object using a structure with photochromic dyes. For example, the photochromic dyes may be added to (e.g., inserted in), painted in/on the object. The object may be constructed to achieve the ability to change appearance in response to light.

The photochromic dyes may be influenced by applying light. Application of light to the photochromic dye may alter a color configuration of the photochromic dye (e.g., reprogram the photochromic dye). The application of light may provide a combination of activation and/or deactivation to the photochromic dye. In an example, particular wavelengths of light may cause an activation and/or deactivation of color channels of the photochromic dye. Selecting the order of application of the wavelengths of light and the particular amount of time that each wavelength of light is applied may enable particular combinations of color to be selected for the photochromic dye. The result of the application of light may produce differentiations in the appearance of the dye.

The differentiation in the dye may comprise a uniform color. For example, the application of light may result in the photochromic dye from changing from one color to another color (e.g., eyeglasses frames may change from a solid red color to a solid black color) The differentiation in the dye may comprise a gradient of color. For example, one section of the object may have a red color, another section may have a blue color, and between the two sections may transition from red to blue. One or both of the two colors of the gradient may be changed by the application of light. The differentiation in dye may comprise a color pattern. For example, the dye may comprise a striped pattern. The application of light may result in the two colors of the striped pattern changing. For example, a tiger stripe pattern (e.g., alternating orange and black stripes) may be changed to a candy cane stripe pattern (e.g., alternating red and white stripes) in response to the application of light. The process of changing color/design may be repeated numerous times to provide the user with multiple options for possible patterns and/or designs (e.g., floral patterns, animal pictures such as dogs or cats, trees or other nature scenes, etc.). The type of pattern and/or the color change of the reactive material in response to the light may be varied according to the design criteria of a particular implementation.

The lighting that affects the color/style of the photochromic dye may be implemented in a container. The container may be a separate item from the object. In one example, the object with the photochromic dye may be a pair of eyeglasses and the container may be an eyeglasses container. The container may work in conjunction with the style changing object. The container may comprise lighting elements configured to interact with the style changing object, a transmitter for communication with an external device (e.g., a smart phone), a power supply (e.g., a battery) and/or a circuit for controlling the lighting. An interior of the container may enable the environment to be controlled in order to provide efficient and/or controlled lighting to the photochromic dye.

The appearance of the style changing object may be changed multiple times. For example, each application of the light may enable the user to change the color and/or appearance of the style changing object. The change of style may be semi-permanent. For example, the style selected in response to the application of light may remain until another application of light is applied. Some change over time may occur (e.g., as sunlight and/or other ambient lighting in the environment is applied over time between the controlled applications of lighting using the container). Generally, the change of style may not be permanent (e.g., the style may be changed as desired by the user). Based on the application of light, the same style may be repeated or a different style may be selected.

Referring to FIG. 1, a diagram illustrating an example embodiment of the present invention is shown. A system 100 is shown. The system may comprise a container 102. The container may comprise a block (or circuit) 104, a block (or circuit) 106, a block (or circuit) 108, a block (or circuit) 110, a block (or circuit) 112, a block (or circuit) 114 and/or a block (or circuit) 116. The circuit 104 may implement lighting elements (e.g., a number of lights). The circuit 106 may implement a control circuit 106. The circuit 108 may implement a power source. The circuit 110 may implement speakers and/or an audio processor. The circuit 112 may implement a communication device. The circuit 114 may implement a microphone 114. The circuit 116 may implement one or more input/output ports. The container 102 may comprise other components (not shown). The number and/or arrangement of the components of the container 102 may be varied according to the design criteria of a particular implementation.

The light elements 104 may comprise a number of lighting elements 130a-130n and colored lighting elements 102. The lighting elements 130a-130n may implement ultraviolet (UV) lights. The colored lighting elements 102 may comprise block (or circuits) 134a-134n and/or blocks (or circuits) 136a-136n. The circuits 134a-134n may implement colored LEDs. The circuits 136a-136n may implement colored LEDs. Generally, the UV lights 130a-130n, the colored LEDs 134a-134n and the colored LEDs 136a-136n may generate light at different wavelengths. The UV lights 130a-130n may generate light in the ultraviolet color spectrum and the colored lights 132 may generate light in the visible color spectrum (e.g., approximately 400 nm-700 nm). In one example, the colored LEDs 134a-134n may comprise blue LEDs and the colored LEDs 136a-136n may comprise red LEDs. In another example, the colored LEDs 134a-134n may comprise green LEDs and the colored LEDs 136a-136n may comprise blue LEDs.

In some embodiments, the light elements 104 may comprise a single type of light emitting element (e.g., multiple light elements of a single type). The single light element may comprise a single diode/cathode/bulb configured to emit a large range of wavelengths (e.g., from approximately 200 nm to 700 nm or more, to cover the UV light spectrum, the visible light spectrum and/or the invisible light spectrum). Multiple types of light elements may not be necessary (e.g., instead of the UV lights 130a-130n, the colored LEDs 134a-134n and/or the colored LEDs 136a-136n one type of light element may be implemented). The type of light elements implemented and/or the light generated by the UV lights 130a-130n and the colored lights 132 may be varied according to the design criteria of a particular implementation.

A reactive object 140 is shown. The reactive object 140 is shown comprising a photochromic dye/ink 142. The reactive object 140 may be the style changing object. For example, the photochromic dye/ink 142 may be configured to react to characteristics of lighting to change color, style and/or appearance.

In some embodiments, the photochromic dye/ink 142 may be layered. Different color/design effects may be achieved by layering the photochromic ink/dye 142 (e.g., as opposed to mixing different color channels of the photochromic ink/dye 142). In an example, layering may facilitate a solid color change, at the cost of achieving consistent patterns. In another example, mixing may facilitate achieving consistent patterns, at the cost of a complete solid color change. The type of application of the photochromic dye/ink 142 to the reactive object 140 may be varied according to the design criteria of a particular implementation.

Characteristics of the UV lights 130a-130n and/or the colored lights 132 may be controlled by the control circuit 106. The characteristics of the UV lights 130a-130n and/or the colored lights 132 may comprise an intensity of light, a wavelength of light and/or which of the lighting elements 130a-130n are active.

The control circuit 106 may be configured to control the characteristics of the UV lights 130a-130n and/or the colored lights 132. The control circuit 106 may be configured to receive input and generate output. For example, the control circuit 106 may be configured to receive instructions from a user. The instructions may comprise a desired color. The control circuit 106 may be configured to interpret the instructions and determine the characteristics of the UV lights 130a-130n and/or the colored lights 132 to apply in order to achieve the desired color. In one example, the control circuit 106 may be configured to apply the UV lights 130a-130n for a particular amount of time, while the colored lights 132 are deactivated. In another example, the control circuit 106 may be configured to apply a combination of the colored LEDs 134a-134n and the colored LEDs 136a-136n for a particular amount of time while the UV lights 130a-130n are deactivated.

A final resulting appearance of the reactive object 140 and/or the photochromic ink/dye 142 may be changed in response to a modification of the reactive object 140 and/or the photochromic ink/dye 142. In one example, the modification of the reactive object 140 and/or the photochromic ink/dye 142 may comprise one or more of sintering the photochromic dye/ink 142, applying multiple layers (e.g., layers comprising various color channels) of the photochromic dye/ink 142 to the reactive object 140, mixing multiple color channels of the photochromic dye/ink 142 before applying the photochromic dye/ink 142 to the reactive object 140, applying a photochromic coating on the reactive object 140 in addition to the photochromic dye/ink 142 and/or applying a non-photochromic coating on the reactive object 140 in addition to the photochromic dye/ink 142. The types of colors/designs selected for the reactive object 140 may be partially affected by a base color of the reactive object 140 The types of colors/designs selected for the reactive object 140 may be partially affected by exposing the photochromic dye/ink 142 to heat/sintering before application to the reactive object 140. The types of colors/designs selected for the reactive object 140 may be partially affected by the material of the reactive object 140 (e.g., wood, plastic, metal, cardboard, etc.). The types of colors/designs selected for the reactive object 140 may be partially affected by a type of covering (e.g., an additional layer) and/or coating applied on top of the photochromic ink/dye 142 (e.g., a UV coating, glass, acrylic, plastic, waterproofing/weatherproofing materials, etc.). In some embodiments, control circuit 106 may be configured to select the characteristics of the light elements 104 based on the type of material, the type of covering, the base color and/or other attributes of the reactive object 140 and/or the photochromic ink 142.

In some embodiments, the control circuit 106 may comprise a processor and/or a system on chip (SoC). The control circuit 106 may comprise a memory. The control circuit 106 may be configured to receive input and/or generate output for the communication device 112 and/or the I/O devices 116. The control circuit 106 may be configured to receive input from the microphone 114. The control circuit 106 may be configured to provide output to be played by the speakers 110.

In some embodiments, the power source 108 may comprise a battery. The battery 108 may be configured to provide power to the components in the container 102 (e.g., the lights 104, the control circuit 106, etc.). In some embodiments, the power source 108 may comprise voltage regulation circuitry and/or a power converter. For example, the power source 108 may be configured to receive an external power source (e.g., an AC power supply, input from a USB port, etc.) and convert the external power source to be usable by the components of the container 102. Implementing the power source 108 as a battery may enable the container 102 to be portable.

The speakers 110 may be configured to generate audio output. In an example, the audio output may be a notification chime. In one example, the notification chime may provide an indication when a sufficient amount of lighting has been applied for achieving a style change of the reactive object 140. In another example, the notification chime may provide a first indication of when the application of the UV lights 130a-130n has been completed and second indication of when the application of the colored lights 132 has been completed.

The communication device 112 may be configured to enable wireless communication. For example, the communication device 112 may implement Bluetooth communication and/or Wi-Fi communication. The communication device 112 may be configured to communicate to a smartphone. For example, the communication device 112 may be configured to receive instructions (e.g., a desired style and/or color) for altering the appearance of the reactive object 140 from a smartphone. For example, a smartphone application (e.g., a companion application) may provide a user interface to enable the user to select a desired color and/or pattern. The control circuit 106 may be configured to select the characteristics of the light elements 130a-130n in response to the desired color and/or pattern selected.

The microphone 114 may be configured to receive audio. In some embodiments, voice instructions may be received. The voice instructions may comprise a desired color and/or pattern. The control circuit 106 may be configured to select the characteristics of the UV lights 130a-130n and/or the colored lights 132 in response to the desired color and/or pattern selected in response to interpreting the voice instructions. For example, a user may state "change color to red" and the control circuit 106 may interpret the voice command and select the characteristics of the UV lights 130a-130n and/or the colored lights 132 to change the photochromic dye/ink 142 to a red color.

The input/output components 116 may be configured to send and/or receive data. In one example, the I/O components 116 may be a USB connection. The I/O components 116 may be configured to receive input (e.g., an instruction for changing a style/color of the reactive object 140).

In some embodiments, the I/O components 116 may be configured to provide a power source for the reactive object 140. In an example, the reactive object 140 may be a chargeable item (e.g., wireless headphones, a smartphone, a smartwatch, etc.) that may consume power while in use. The I/O components 116 may be configured to provide power to enable charging of the reactive object 140. In one example, the I/O components 116 may comprise a USB connection that may plug into the reactive object 140 to recharge a battery of the reactive object 140. The I/O components 116 may be configured to recharge the reactive object 140 at any time (e.g., regardless of whether the light components 104 are active or not). In an example, the I/O components 116 may be configured to recharge power to the reactive object 140 while the color/design of the photochromic ink 142 is being activated/deactivated. In another example, the I/O components 116 may be configured to recharge power to the reactive object 140 when the container 102 is used for storage. In an example, the I/O components 116 may supply power to the reactive object 140 for recharging from the power source 108.

In some embodiments, the container 102 may be implemented as a housing for the apparatus 100. The apparatus 100 may comprise the housing 102, the lighting elements 104, the control circuit 106, the power source 108, the speakers 110, the communication device 112, the microphone 114 and the interface 106. The housing 102 may be configured as a portable container for the components of the apparatus 100. In embodiments of the apparatus 100 that implement the housing 102 instead of the container, the reactive object 140 (e.g., coated and/or embedded with the photochromatic dye 142) may not be inserted into the housing 102.

The apparatus 100 may be implemented as a portable light source the that has ability to produce various wavelengths and/or other light characteristics that may induce a change in the reactive object 140. In one example, the wavelength generated may be approximately 200 nm-1200 nm. The characteristics of the light selected may interact with the photochromatic dye 142 to change the aesthetic/appearance of the reactive object 140.

The housing 102 may be configured to contain one or more components of the apparatus 100 (e.g., the components 104-116). The housing 102 may be implemented with a handle shape to enable the portable light source 100 to be hand-held. The interface 116 may be configured to receive input from the user and/or display output from the user. The interface 116 may be implemented on an outside of the housing 102. The reactive object 140 may be exterior to the housing 102 to enable the light sources to be directed at the reactive object 140.

Figure 2:
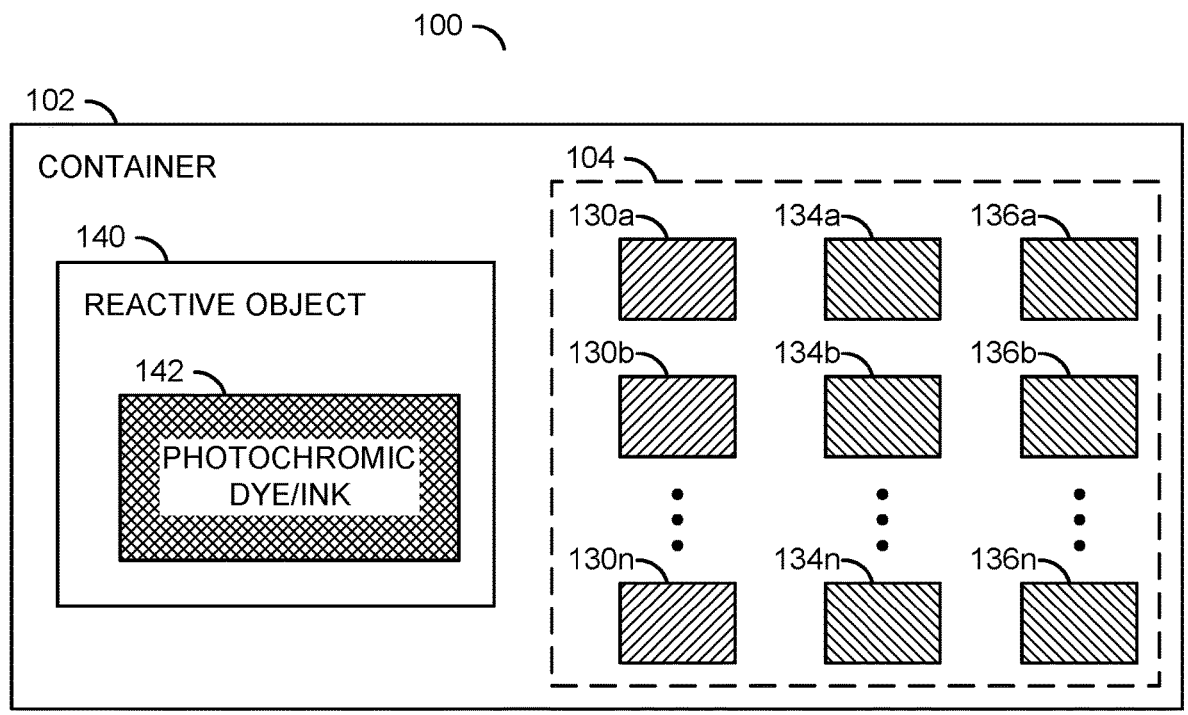
FIG. 2 is a diagram illustrating changing a style of a reactive object by applying light.

Referring to FIG. 2, a diagram illustrating changing a style of a reactive object by applying light is shown. The reactive object 140 is shown within the container 102. The UV lights 130a-130n, the colored LEDs 134a-134n and/or the colored LEDs 136a-136n are shown activated. The UV lights 130a-130n, the colored LEDs 134a-134n and/or the colored LEDs 136a-136n may apply light to the reactive object 140, while the reactive object 140 is within the container 102. In the example shown, all of the UV lights 130a-130n, the colored LEDs 134a-134n and/or the colored LEDs 136a-136n are shown as active for illustrative purposes. Generally, either the UV lights 130a-130n are activate while the colored LEDs 134a-134n and the colored LEDs 136a-136n are inactive or the UV lights 130a-130n are inactive while a combination of the colored LEDs 134a-134n and/or the colored LEDs 136a-136n are active.

The container 102 may provide a controlled environment for the UV lights 130a-130n and the colored lights 132. For example, the container 102 may block external light sources from affecting the characteristics of the UV lights 130a-130n and/or the colored lights 132. By providing a controlled environment, the control circuit 106 may ensure that the selected light characteristics provide the desired color/style for the reactive object 140. In the example shown, the photochromic dye/ink 142 is shown reacting to the activated UV lights 130a-130n and/or the colored lights 132. For example, the UV lights 130a-130n may be applied to the reactive object 140 first, and then the colored lights 132 may be applied to the reactive object 140 next. In an example, the reaction of the photochromic dye/ink 142 may be a change in color.

In some embodiments, the reactive object 140 may be a pair of eyeglasses. For example, the frames of the eyeglasses may be painted and/or contain the photochromic dye 142. In some embodiments, the reactive object 140 may be a smartphone case/cover. In some embodiments, the reactive object 140 may be earphones (or earbuds). In some embodiments, the reactive object 140 may be a watch. The type of object used as the reactive object 140 may be varied according to the design criteria of a particular implementation.

Figure 3:
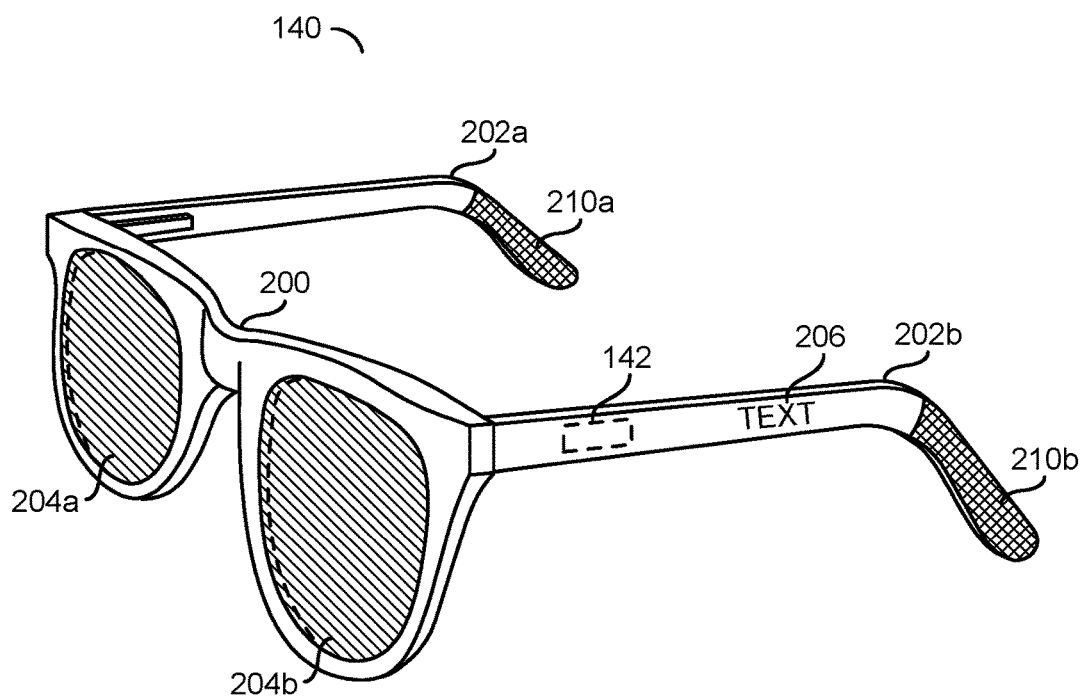
FIG. 3 is a diagram illustrating an example embodiment of the invention implemented as a pair of eyeglasses.

Referring to FIG. 3, a diagram illustrating an example embodiment of the invention implemented as a pair of eyeglasses is shown. The reactive object 140 is shown as a pair of eyeglasses. The eyeglasses 140 may be one example type of object that may be a reactive object.

The eyeglasses 140 may comprise a frame 200, arms (or temple parts) 202a-202b and/or lenses 204a-204b. The frame 200 may be a material forming a structure that encircles and/or supports the lenses 204a-204b. The frames 200 may generally be the portion of the eye apparatus 140 that may be most prominently seen. The temple parts 202a-202b may be configured to secure the eyewear apparatus 140 to the user. The lenses 204a-204b may be prescription (e.g., corrective) or non-prescription lenses (e.g., tinted sunglasses).

The reactive material 142 is shown. In the example shown, the reactive material 142 is shown as a dotted box on the temple part 202*b*. In one example, the reactive material 142 may be painted onto the eyeglasses 140. For example, a surface of the temple parts 202*a*-202*b* and the frames 200 may be painted using the reactive material 142. Generally, the frames 200 may be where a variation of appearance resulting from the application of light to the dye/ink 142 may appear most prominently. For example, the glasses 140 may be created with the dye/ink 142 painted on the frames 200.

In some embodiments, the dye/ink 142 may be a liquid ink. In an example, the frames 200 and/or the temple parts 202*a*-202*b* may be a clear plastic material and the dye/ink 142 may be a liquid contained within the plastic material. In another example, the dye/ink 142 may be infused or concealed within the frames 200 (e.g., a change in appearance may be triggered using lights or possibly an electrical pulse).

Text 206 is shown on the arm 202*b*. Similar text to the text 206 may be on the arm 202*a* (not visible from the perspective shown). The text 206 may comprise a different material and/or a different coating than the rest of the frames 200 and/or the arms 202*a*-202*b*. The different material and/or coating (e.g., a UV resistant coating) may enable the text 206 to be visible in a different color than the color of the frames 200 and/or the arms 202*a*-202*b*. For example, the material and/or coating of the text 206 may react differently to the same application and/or time of application to the UV lights 130*a*-130*n* and/or the colored lights 132 than the frames 200 and/or the arms 202*a*-202*b*.

In one example, the text 206 may be highlighted when a different color is applied to the text 206 than the frames 200 and/or the arms 202*a*-202*b*. In another example, the text 206 may be hidden when the same color is applied to the text 206 as the frames 200 and/or the arms 202*a*-202*b*. In the example shown, the text 206 may comprise letters. In another example, the text 206 may comprise numbers (e.g., a number worn by a player on a sports team). In some embodiments, the text 206 may comprise a logo and/or other type of image. The type of design used for the text 206 may be varied according to the design criteria of a particular implementation.

The text 206 may enable a form of gamification for the wearer. When the reactive object 140 is removed from the container 102 after the light has been applied, the text 206 may be hidden (e.g., the same color as the rest of the frames 200 and/or the arms 202*a*-202*b*). Over time, the color for the text 206 may fade at a faster or slower rate than the color for the frames 200 and/or the arms 202*a*-202*b*, which may enable the text 206 to be revealed slowly over time. For example, the text 206 may be used as a secret message that is revealed over time.

Sleeves 210*a*-210*b* are shown on the respective arms 202*a*-202*b*. In some embodiments, the sleeves 210*a*-210*b* may be added to the eyeglasses 140 (e.g., to improve functionality or design). The sleeves 210*a*-210*b* may also be created using the photochromic dye/ink 142. For example, the sleeves 210*a*-210*b* may enable the frames 200 and/or temple parts 202*a*-202*b* to have one type of design and the sleeves may have an alternate design. In the example shown, the sleeves 210*a*-210*b* may cover a portion of the arms 202*a*-202*b* and the arms 202*a*-202*b* are shown having one design and the sleeves 210*a*-210*b* are shown having a different design. For example, the sleeves 210*a*-210*b* may comprise a different composition of the dye/ink 142 and/or a different coating (e.g., a partial UV coating) than the arms 202*a*-202*b* to enable different designs when exposed to the same amount and time of the UV lights 130*a*-130*n* and the colored lights 132 while in the container 102.

In some embodiments, the ability to change the style/design of the eyeglasses 140 may be implemented by placing the eyeglasses 140 within the container 102. In some embodiments, the ability to change the style/design of the eyeglasses 140 may be implemented by using a prism configured to channel light emitted by an LED from a smartphone.

One style of eyeglasses 140 is shown as an illustrative example. Various alterations may be made to the eyeglasses 140. Alterations may comprise, but are not limiting to, adjusting the size of the eye apparatus 140 to fit user preference as well as minimal altercations that may increase affordability and performance without changing the inherent function of the eye apparatus 140.

Figure 4:
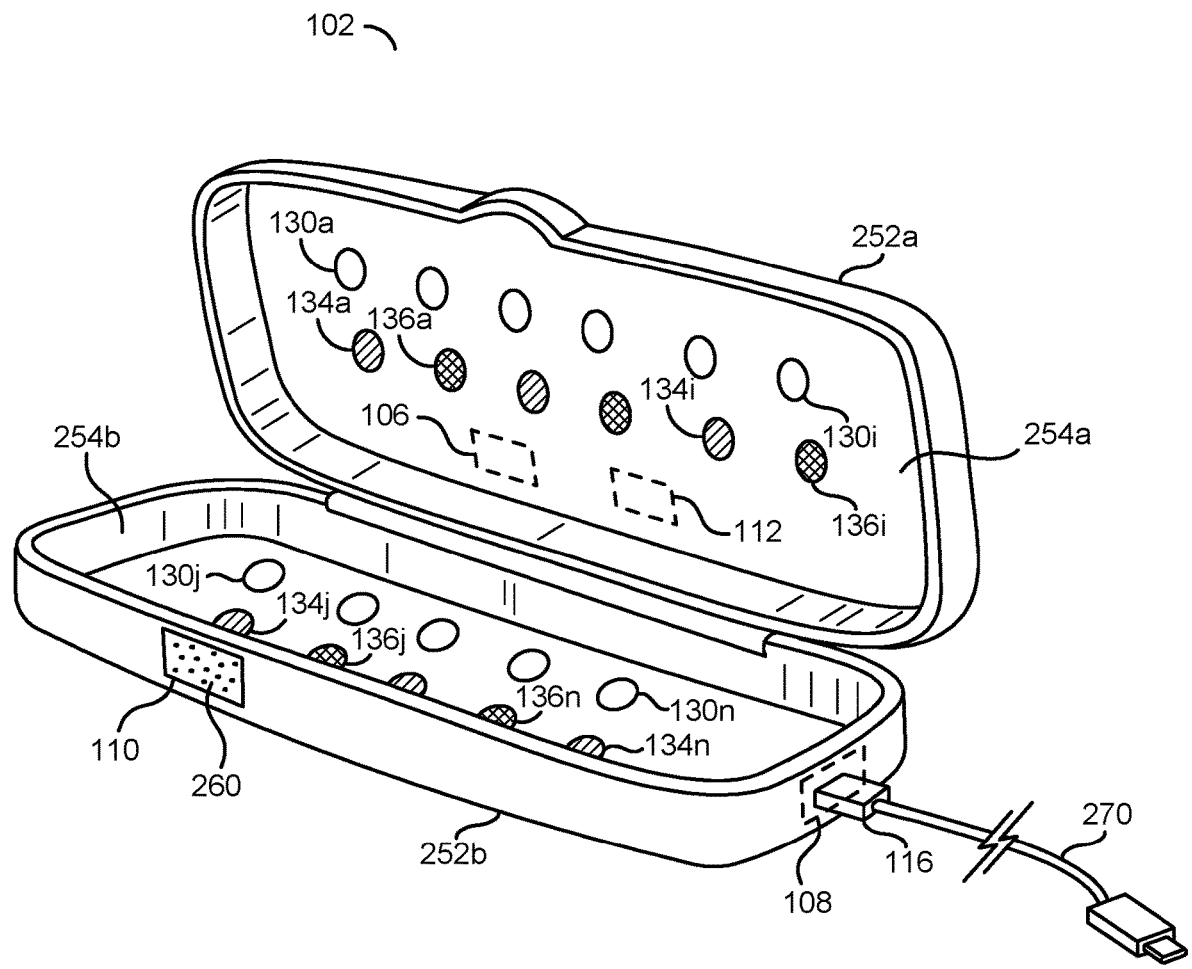
FIG. 4 is a diagram illustrating an example embodiment of a container implementing lights configured to alter the appearance of an inserted item.

Referring to FIG. 4, a diagram illustrating an example embodiment of a container implementing lights configured to alter the appearance of an inserted item is shown. The container 102 is shown. The container 102 is shown open with no object inside. In the example shown, the container 102 may be implemented as a clamshell design.

The container 102 may comprise an outer shell 252*a*-252*b*. The outer shell 252*a* may be a top portion of the clamshell design and the outer shell 252*b* may be a bottom portion of the clamshell design. The outer shell 252*a*-252*b* may open and close and may be made of material that provides protection to the contents inside of the container 102.

The container 102 may comprise an inner surface 254*a*-254*b*. The reactive object 140 may rest on the inner surface 254*a*-254*b*. Generally, the inner surface 254*a*-254*b* may comprise a material that may prevent the reactive object 140 from being damaged when within the container 102 (e.g., padding to prevent scratches to the lenses 204*a*-204*b*). For example, the material of the inner surface 254*a*-254*b* may be glass, fabric, mirrors, more lights, etc.

The UV lights 130*a*-130*n* are shown on the inner surface 254*a*-254*b*. The colored LEDs 134*a*-134*n* and the colored LEDs 136*a*-136*n* are shown on the inner surface 254*a*-254*b*. In the example shown, the UV lights 130*a*-130*n* are shown as a separate strip of lights from the colored LEDs 134*a*-134*n* and the colored LEDs 136*a*-136*n*. In the example shown, the colored LEDs 134*a*-134*n* and the colored LEDs 136*a*-136*n* are shown in the same strip of lights in an alternating pattern. In the example shown, the UV lights 130*a*-130*n* and the colored LEDs 134*a*-134*n* and the colored LEDs 136*a*-136*n* are shown as a number of round lighting elements. In another example, the UV lights 130*a*-130*n* and the colored lights 132 may be part of the same strip of lights (e.g., in an alternating pattern). In yet another example, each of the UV lights 130*a*-130*n*, the colored LEDs 134*a*-134*n* and the colored LEDs 136*a*-136*n* may each have a separate strip of lights. While two strips of lights are shown, multiple (e.g., 3-10) strips of lights may be implemented. In an example, the UV lights 130*a*-130*n*, the colored LEDs 134*a*-134*n* and the colored LEDs 134*a*-134*n* may have a small rectangular shape. The size, shape and/or layout of the UV lights 130*a*-130*n*, the colored LEDs 134*a*-134*n* and/or the colored LEDs 136*a*-136*n* may be varied according to the design criteria of a particular implementation.

The UV lights 130*a*-130*n* and/or the colored lights 132 may be within the container 102 to emit light onto the reactive object 140 when the reactive object 140 is inside the container 102. Some of the light elements (e.g., the UV lights 130*a*-130*i*, the colored LEDs 134*a*-134*i* and/or the colored LEDs 136*a*-136*i*) are on the top portion of the inner surface 254*a* and some of the light elements (e.g., the UV lights 130*j*-130*n*, the colored LEDs 134*j*-134*n* and/or the colored LEDs 136*j*-136*n*) are on the bottom portion of the inner surface 254*b*. The UV lights 130*a*-130*n* and/or the colored lights 132 may be located throughout the inner surface 254*a*-254*b* to ensure that light may be applied to all surfaces of the reactive object 140 (e.g., to apply even lighting and/or a consistent application of the light characteristics).

The UV lights 130*a*-130*n*, the colored LEDs 134*a*-134*n* and/or the colored LEDs 136*a*-136*n* may comprise LED lighting elements. The LED UV lights 130*a*-130*n*, the colored LEDs 134*a*-134*n* and/or the colored LEDs 136*a*-136*n* may be configured to emit light at a wavelength that may be controllable by the control circuit 106. In an example, the colored LEDs 134*a*-134*n* and/or the colored LEDs 136*a*-136*n* may comprise RGB elements and the input to the colored LEDs 134*a*-134*n* and/or the colored LEDs 136*a*-136*n* may be configured to select a particular color output. For example, the color output of the colored LEDs 134*a*-134*n* and/or the colored LEDs 136*a*-136*n* may be one of the characteristics that affects the change in appearance of the reactive material 142. In one example, one or more of the colored lights 132 may be common cathode LEDs. In another example, one or more of the colored lights 132 may be common anode LEDs.

In some embodiments, the UV lights 130*a*-130*n*, the colored LEDs 134*a*-134*n* and/or the colored LEDs 136*a*-136*n* may comprise a LED driver circuit configured to receive an input from the control circuit 106. The LED driver circuit may be configured to generate a particular light characteristic for the UV lights 130*a*-130*n*, the colored LEDs 134*a*-134*n* and/or the colored LEDs 136*a*-136*n* in response to an input from the control circuit 106. For example, the LED driver circuit may be configured to convert an instruction from the control circuit 106 into electrical signals usable by the UV lights 130*a*-130*n*, the colored LEDs 134*a*-134*n* and/or the colored LEDs 136*a*-136*n* for applying the various characteristics (e.g., a color (e.g., an intensity of red light, blue light and/or green light), a wavelength, an saturation, a brightness and/or a frequency) of the LED elements 130*a*-130*n*.

In some embodiments, the UV lights 130*a*-130*n* may be configured to emit ultraviolet (UV) light. In some embodiments, the UV lights 130*a*-130*n* may be configured to emit infrared (IR) light. For example, the characteristics of the light emitted by the UV lights 130*a*-130*n*, the colored LEDs 134*a*-134*n* and/or the colored LEDs 136*a*-136*n* may comprise a combination of RGB lighting, UV light and/or IR light. The technology and/or type of lighting implemented as the UV lights 130*a*-130*n*, the colored LEDs 134*a*-134*n* and/or the colored LEDs 136*a*-136*n* may be varied according to the design criteria of a particular implementation.

Various hardware components are shown as part of the container 102. Generally, the hardware components (e.g., the control circuit 106, the wireless communication device 112, the power supply 108, the speaker 110) may be located in the container 102 between the outer shell 252*a*-252*b* and the inner surface 254*a*-254*b*.

A speaker grille 260 is shown on the outer shell portion 252*b*. The speaker grille 260 may enable audio played by the speaker 110 to be emitted clearly. For example, the speaker 110 may play a chime when the application of light to the reactive object 140 has been completed.

A cable 270 is shown connected to an I/O port 116. The I/O port 116 may be configured to receive data and/or power from the cable 270. In an example, the cable 270 may be a USB cable. The I/O port 116 may be configured to transmit power from the cable 270 to the power source 108. For example, the container 102 may be powered using an external power supply (e.g., by plugging in the USB cable 270 and/or via wireless charging).

In the example shown, the cable 270 is shown extending outside of the container 102. In some embodiments, the cable 270 and/or the I/O port 116 may be within the container 102. For example, the I/O port 116 may be implemented on the inner surface 254*a*-254*b*. Implementing the I/O port 116 on the inner surface 254*a*-254*b* may enable the battery 108 to recharge the power of the reactive object 140.

The container 102 may be configured to act as an asset to the reactive object 140. For example, the container 102 may be configured to store the reactive object 140. In some embodiments, the container 102 may be configured to charge the reactive object 140 (e.g., rechargeable earbuds, smart glasses, smart watches, etc.). In another example, the container 102 may be equipped with technology to aid the reactive object 140 (e.g., enable changing of the color/style). In the example shown, the container 102 may be an eyeglasses case. In another example, the container 102 may be a case for headphones/earbuds. In yet another example, the container 102 may be a case for a watch. In still another example, the container 102 may be a case for a guitar. The size of the container 102 may be made to be appropriate for the size of the reactive object 140 (e.g., earbuds may have a smaller size of the container 102 than eyeglasses, and a guitar may have a much larger size of the container 102 than eyeglasses). The size and/or shape of the container 102 may be varied according to the design criteria of a particular implementation.

Figure 5:
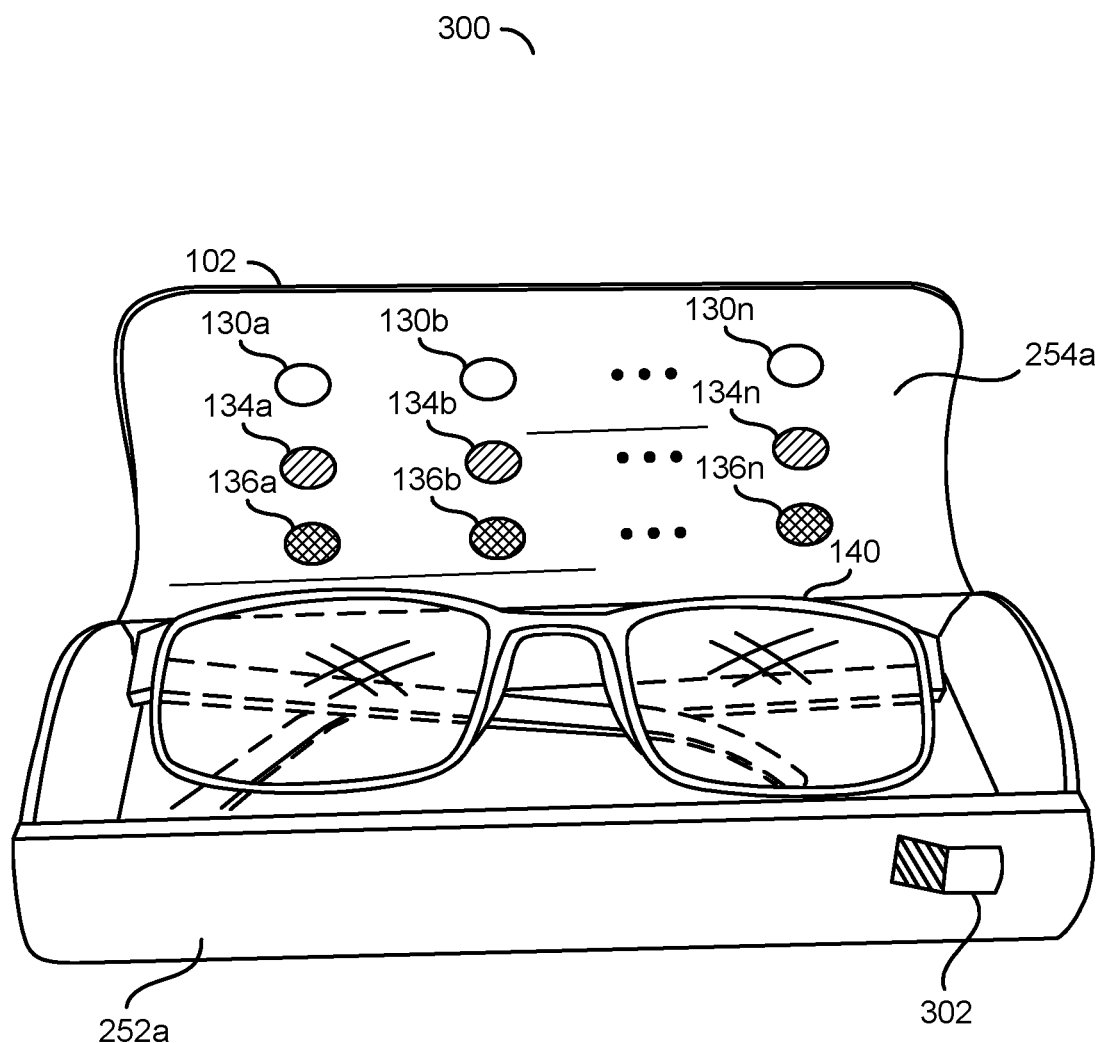
FIG. 5 is a diagram illustrating an example embodiment of the container implementing lights configured to alter the appearance of eyeglasses and provide storage for the eyeglasses.

Referring to FIG. 5, a diagram illustrating an example embodiment of the container implementing lights configured to alter the appearance of eyeglasses and provide storage for the eyeglasses is shown. An example embodiment 300 is shown. The example embodiment 300 may comprise the eyeglasses 140 inside the case 102. For example, the portion of the case 102 comprising the inner surface 254*a* may be closed over top of the eyeglasses 140. The UV lights 130*a*-130*n*, the colored LEDs 134*a*-134*n* and/or the colored LEDs 136*a*-136*n* may be activated by the control circuit 106. The light may be applied to the eyeglasses 140 to change the appearance of the photochromic material 142.

A physical switch 302 is shown on the container 102. The switch 302 may be configured to activate and/or control characteristics of the light elements 104. In some embodiments, the wireless communication device 112 may be configured to receive instructions from a smartphone app to control the activation of the light elements 104. In some embodiments, the microphone 114 may be configured to receive a voice command from a user to activate and/or control the characteristics of the light elements 104. The container 102 may be configured to apply the light to the photochromic dye/ink 142 to change the appearance of the eyeglasses 140 (e.g., or headphones or other object).

The speaker 110 may be configured to provide a notification that the process of changing the color of the reactive object 140 has been completed. In one example, the speaker 110 may generate a buzz or chime sound. In another example, the speaker 110 may provide a recording of a spoken voice to indicate how the appearance of the reactive object 140 has changed (e.g., a voice may state "purple glasses are now ready" in response to the light characteristics changing the reactive object 140 to a purple color.

The user may decide when to place the eyeglasses 140 into the container 102. For example, the user may keep a particular design/style long-term by not re-applying the light. The container 102 may be used as a protective case and/or for recharging the reactive object 140 (e.g., rechargeable earbuds, a smartphone, a smartwatch, etc.) without applying the lighting (e.g., to keep the same style/design).

In some embodiments, the control circuit 106 may be configured to select different characteristics for the light elements 104 at different locations within the container 102. Selecting different characteristics at different locations within the container 102 may enable applying different patterns/textures/colors on the reactive object 140 at different portions of the reactive object 140. A fine granularity of the selection of the characteristics of the light elements 104 may enable detailed textures to be applied to the reactive object 140. The granularity and/or resolution of the selection of the characteristics of the light emitted by different light elements 104 at different locations within the container 102 may be varied according to the design criteria of a particular implementation.

Figure 6:
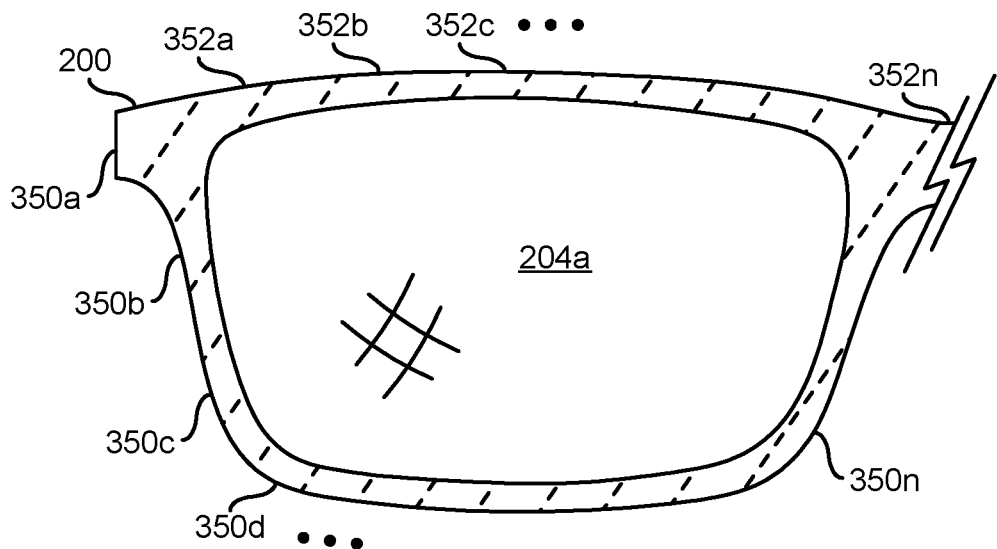
FIG. 6 is a diagram illustrating an example embodiment of a reactive object painted with a pattern using a photochromic dye.

Referring to FIG. 6, a diagram illustrating an example embodiment of a reactive object painted with a pattern using a photochromic dye is shown. A portion of the eyeglasses 140 are shown with the frame 200 and the lens 204a. The eyeglasses 140 may be painted using the photochromic dye/ink 142.

In the example shown, the frames 200 may be painted with a stripe pattern. The stripe pattern may comprise alternating sections 350a-350n and sections 352a-352n. For example, the sections 350a-350n may be painted with different types of photochromic dye/ink 142 than the sections 352a-352n. In another example, the sections 350a-350n may have a coating applied (e.g., a coating that resists the absorption of UV light), while the sections 352a-352n may not have the coating applied. The photochromic dye/ink 142 used for the sections 350a-350n may react differently than the photochromic dye/ink 142 used for the sections 352a-352n when the same characteristics of light are applied.

In the example shown, the light may not yet have been applied to the sections 350a-350n and 352a-352n. While a striped pattern is shown, the type of pattern used (e.g., vertical stripes, horizontal stripes, swirls, etc.) may be varied according to the design criteria of a particular implementation.

Figure 7:
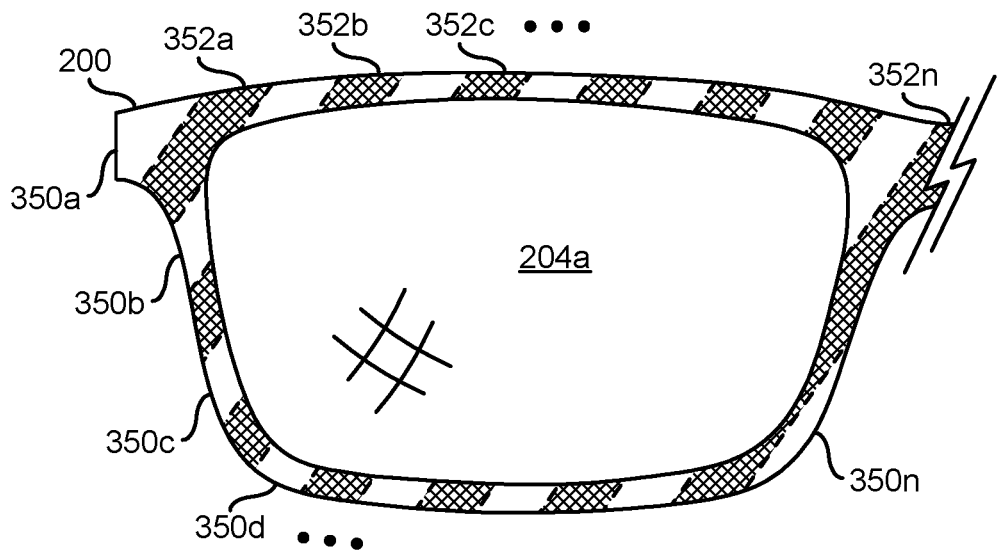
FIG. 7 is a diagram illustrating an example embodiment of a reactive object with an altered style in response to applying light.

Referring to FIG. 7, a diagram illustrating an example embodiment of a reactive object with an altered style in response to applying light is shown. The same portion of the eyeglasses 140 is shown as described in association with FIG. 6. The portion of the frames 200 and the lens 204a are shown. The alternating sections 350a-350n and 352a-352n are shown.

In the example shown, the light may have been applied using the light elements 104. Since different photochromic dye/ink 142 may be applied to the sections 350a-350n compared to the sections 352a-352n, the style/color, after applying the light from a combination of the light elements 104, the sections 350a-350n and the sections 352a-352n may have a different appearance. In the example shown, the sections 350a-350n may appear unshaded and the sections 352a-352n may appear unshaded. For example, the sections 350a-350n may have a white color and the sections 352a-352n may have a black color (e.g., a zebra-stripe pattern). In another example, the sections 350a-350n may have a red color and the sections 352a-352n may have a blue color. In another example, the sections 350a-350n and the sections 352a-352n may both result in the same color (e.g., a solid color pattern). The types of colors resulting from the application of light may be varied according to the design criteria of a particular implementation.

The application of the light to the photochromic dye/ink 142 may result in an alteration of appearance of the reactive object 140. The application of light from the light elements 104 may result in a change in color. The application of light from the light elements 104 may result in a change in design. The photochromic dye/ink 142 may respond to light waves generated by the UV lights 130a-130n, the colored LEDs 134a-134n and/or the colored LEDs 136a-136n in order to change appearance. The control circuit 106 may be configured to manipulate the wavelength of the light output by the light elements 104. In some embodiments, the light elements 104 may alter the characteristics of the light emitted within the container 102 in response to electronic instructions.

The reactive object 140 may change in appearance in response to being placed into the container 102 to receive the light waves generated by the light elements 104. In some embodiments, the physical switch 302 may be used to initiate the change in color (e.g., activate the UV 130a-130n and then a combination of the colored LEDs 134a-134n and/or the colored LEDs 136a-136n). In some embodiments, the change in color (e.g., activation of the light elements 104 and/or the selection of the characteristics of the light elements 104) may be specified using a smart device (e.g., inputting instructions using an app, connecting to a smart home device such as an Alexa/Nest/Siri). The container 102 may be configured to provide on-demand changes to the reactive object 140.

Figure 8:
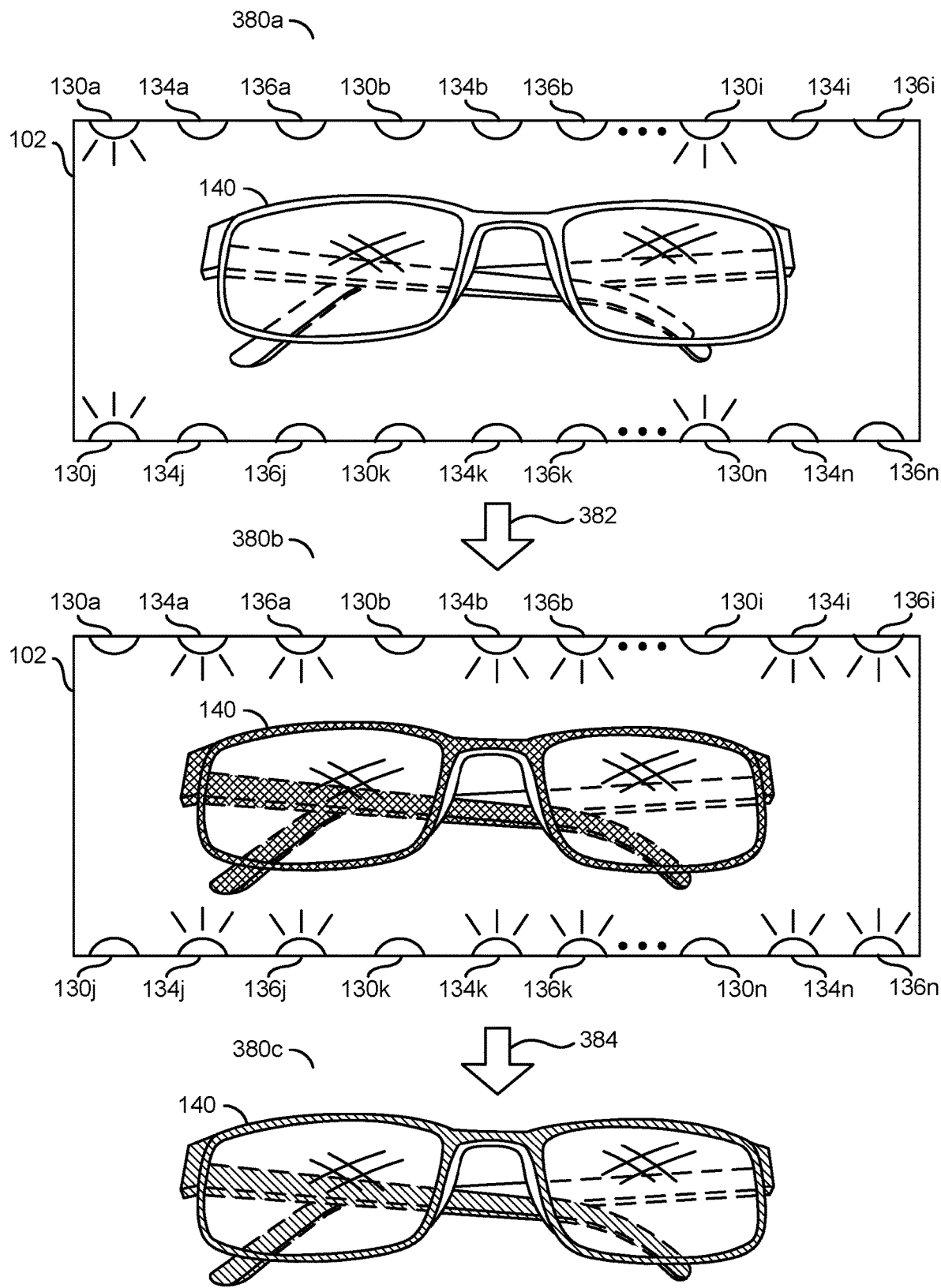
FIG. 8 is a diagram illustrating activating color channels and deactivating color channels of a reactive object by applying various types of light.

Referring to FIG. 8, a diagram illustrating activating color channels and deactivating color channels of a reactive object by applying various types of light is shown. A sequence of time and/or steps 380a-380c is shown. The sequence of time 380a-380c may comprise applying a design (e.g., a color change) to the reactive object 140. In the example shown, the reactive object 140 may comprise a pair of eyeglasses. Similarly, the sequence of time/steps 380a-380c may apply to the application of color to other types of reactive objects (e.g., a watch, a guitar body, earbuds, etc.). The amount of time of exposure for different types of objects may be different.

Generally, the sequence of events shown in the sequence of time 380a-380c may be similar for various types of objects. In one example, the sequence of time 380a-380c may be approximately five minutes long (e.g., approximately two and a half minutes in the first step 380a and approximately two and a half minutes in the second step 380b). In another example, the sequence of time may be six minutes long (e.g., one minute in the first step 380a and five minutes in the second step 380b). In yet another example, the sequence of time may be sixty seconds for glasses and/or earbuds. The amount of time in any of the steps of the sequence of time 380a-380c may be selected dependent on the color selected by the user and/or the type of reactive object 140. The control circuit 106 may be configured to determine the length of time for each step of the sequence of time 380a-380c in response to the color selected by the user and/or various attributes of the reactive object 140 (e.g., material, additional layers on top of the photochromic ink 142, the mixture and/or layers of the photochromic ink 142, etc.). The amount of time for the sequence of time 380a-380c may be varied according to the design criteria of a particular implementation.

The step 380a may be a first step when applying a color and/or design to the reactive object 140. The reactive object 140 may be enclosed within the container 102. The UV lights 130a-130n, the colored LEDs 134a-134n and the colored LEDs 136a-136n are shown in the container 102 with the reactive object 140. In the example shown, the no shading/hatching is illustrated on the reactive object 140 to represent that the reactive object is not colored (or the color has faded).

To apply the color to the reactive object 140, the photochromic ink 142 may be activated (e.g., initialized, charged or primed). The reactive object 140 may be primed by applying light in the ultraviolet spectrum of light. In the container 102, the UV lights 130a-130n are shown activated. In the container 102, the colored LEDs 134a-134n and the colored LEDs 136a-136n may be deactivated. Activating the UV lights 130a-130n and deactivating the colored lights 132 may enable the light in the ultraviolet spectrum to be applied to the reactive object 140. The UV light emitted by the UV lights 130a-130n may prime the photochromic ink 142. The photochromic ink 142 may comprise a mixture of various types of photochromic dyes. In one example, the photochromic ink 142 may comprise a mixture of all color channels. In another example, the photochromic ink 142 may comprise a combination of one or more of the color channels (e.g., a mixture of two types of dyes). Limiting the number of photochromic dyes in the photochromic ink 142 applied to the reactive object 140 may reduce a number of final result colors available but increase an amount of control of the final result color compared to the photochromic ink 142 comprising a mixture of all the color channels. The composition of the photochromic ink 142 may be varied according to the design criteria of a particular implementation.

Priming the photochromic ink 142 may comprise transforming the photochromic ink 142 from a transparent state to a colored state by absorbing the UV light generated by the UV lights 130a-130n. For example, the photochromic ink 142 may comprise a mixture of a cyan, magenta and yellow color (e.g., three different color channels) mixed together into a single solution. When the cyan, magenta, and yellow photochromic colors channels are mixed together into a single solution and the solution is activated with the UV light generated by the UV lights 130a-130n all three color channels may become fully saturated. When the color channels are fully saturated, the photochromic ink 142 may have a 'true color' (e.g., a black color when a properly mixed combination of all the color channels for the photochromic ink 142 is applied, but the true color may vary).

In the example shown, the reactive object 140 may currently be shown having the photochromic ink 142 in the transparent state (e.g., all color channels deactivated). In some embodiments, the reactive object 140 may have a base color (e.g., white or a non-white color when all color channels are deactivated). The base color may be implemented to aid the look of the final output color. For example, particular base colors may improve an appearance of the final result of the photochromic ink 142 (e.g., similar to how a base coat of paint or a primer improves how a paint color looks when applied). In the step 380a, the UV lights 130a-130n may activate (e.g., prime) the photochromic ink 142. In one example, in the step 380a the UV lights 130a-130n may be active for approximately 2-3 minutes.

An arrow 382 is shown. The arrow 382 may represent the passage of time for the step 380a (e.g., 1 minutes, 5 minutes, 10 minutes, etc.). After the step 380a, the next step in the sequence of time 380a-380c may be the step 380b. The step 380b may be a second step when applying a color and/or design to the reactive object 140. The reactive object 140 may be enclosed within the container 102. The UV lights 130a-130n, the colored LEDs 134a-134n and the colored LEDs 136a-136n are shown in the container 102 with the reactive object 140. In the example shown, a shading and/or cross-hatching effect is illustrated on the reactive object 140 to represent that the reactive object 140 is activated (e.g., all three color channels of the photochromic ink 142 are fully saturated).

To apply the color to the reactive object 140, after the photochromic ink 142 has been activated (e.g., all of the applied color channels fully activated), particular color channels may be deactivated to result in a desired color. The photochromic ink 142 may be transformed back from the fully colored state to transparent through the absorption of visible light (e.g., deactivation). Color channels of the photochromic ink 142 may be deactivated by applying light in the visible spectrum of light. Complete deactivation of all the color channels may result in the photochromic ink 142 appearing transparent. Partial deactivation of particular color channels of the photochromic ink 142 may result in a particular color and/or pattern (e.g., the desired color/design). In an example, the process of selecting the desired color/design generally comprises full activation of the color channels (e.g., applying the UV light) and then partial deactivation of one or more color channels. Details of the activation and/or deactivation of the photochromic ink 142 may be described in "Photo-Chromeleon: Re-Programmable Multi-Color Textures Using Photochromic Dyes", Yashua et al., In UIST, pp. 701-712. 2019, appropriate portions of which are hereby incorporated by reference.

In the container 102, the UV lights 130a-130n are shown deactivated. In the container 102, the colored LEDs 134a-134n and the colored LEDs 136a-136n may be activated. Deactivating the UV lights 130a-130n and activating the colored lights 132 may enable the light in the visible spectrum or invisible spectrum to be applied to the reactive object 140. The visible light emitted by the colored LEDs 134a-134n and/or the colored LEDs 136a-136n may deactivate the photochromic ink 142.

To enable the photochromic ink 142 to adjust to a color other than black (e.g., the fully activated state), the colored lights 132 may be selected by the control circuit 106 to deactivate one or more color channels. In one example, deactivating the cyan color may result in red color of the photochromic ink 142 (e.g., only yellow and magenta remain activated). Each color channel of the photochromic ink 142 may be deactivated individually by applying a different wavelength of light in the visible spectrum. In the example shown, both the colored LEDs 134a-134n and the colored LEDs 136a-136n are shown activated. However, various combinations of intensity of the colored LEDs 134a-134n and/or the colored LEDs 136a-136n may be selected by the control circuit 106 in order to deactivate the appropriate color channels to adjust the photochromic ink 142 to the color desired by the user. For example, a deactivation peak for each color channel may be at a different wavelength in the visible or invisible light spectrum (e.g., 700 nm-800 nm may not be visible but may affect the photochromic ink/dye 142).

In one example, shining a blue color from the combination of the colored lights 132 may deactivate the yellow color channel. In another example, shining a green color from the combination of the colored lights 132 may deactivate the magenta color channel. In yet another example, shining a red color from the combination of the colored lights 132 may deactivate the cyan color channel. The control circuit 106 may be configured to deactivate the specific color channels of the photochromic ink 152 by projecting RGB lighting from the colored lights 132 to reduce saturation levels in particular color channels in order to select the desired color for the reactive object 140.

In the example shown for the step 380b, the reactive object 140 may currently be shown having the photochromic ink 142 in the fully saturated color state. In the step 380b, the colored lights 132 may deactivate one or more color channels of the photochromic ink 142. In one example, in the step 380b the colored lights 132 may be active for approximately 2-3 minutes.

An arrow 384 is shown. The arrow 384 may represent the passage of time for the step 380b (e.g., 1 minutes, 5 minutes, 10 minutes, etc.). After the step 380b, the next step in the sequence of time 380a-380c may be the step 380c. The step 380c may be the final result after applying a color and/or design to the reactive object 140. In the step 380c, the reactive object 140 may not be within the container 102. For example, the reactive object 140 may be the final result of applying the color/design of the photochromic ink 142 and may be ready to be worn by the user. In the example shown, a shading/hatching effect is illustrated on the reactive object 140 to represent that some of the color channels of the photochromic ink 142 have been deactivated and/or partially deactivated (e.g., the three color channels of the photochromic ink 142 are no longer fully saturated).

Generally, the color/design of the reactive object 140 may appear closest to the desired/selected color shortly after the reactive object 140 has been removed from the container 102 (e.g., after the color channels have been deactivated by the colored lights 132). Over time, the desired color of the reactive object 140 may gradually fade. For example, ambient visible and/or invisible light in the environment may slowly deactivate one or more of the color channels of the photochromic ink 142 (e.g., sunlight, artificial light sources in the environment, etc.). The user may perform the sequence of steps 380a-380c again to re-apply the desired color or select a different color (e.g., activate all the color channels of the photochromic ink 142 using the UV lights 130a-130n and then deactivate specific amounts of particular color channels using a combination of the colored LEDs 134a-134n and/or the colored LEDs 136a-136n).

Figure 9:
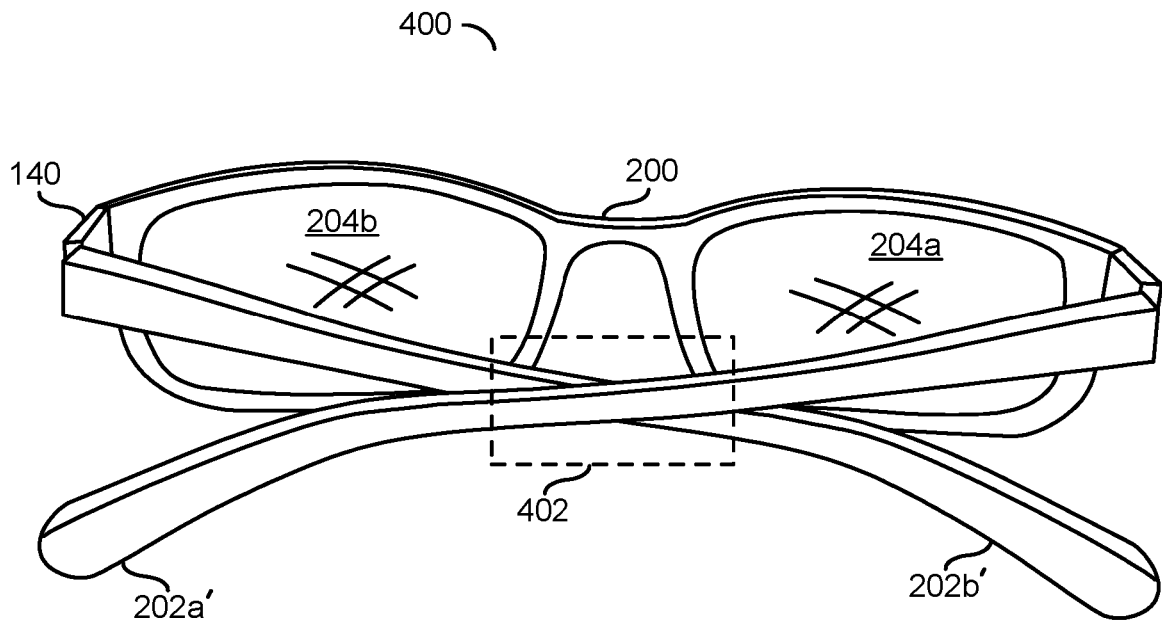
FIG. 9 is a diagram illustrating a modification to arms of eyeglasses for exposing more surface area to light.

Referring to FIG. 9, a diagram illustrating a modification to arms of eyeglasses for exposing more surface area to light is shown. A view 400 of the reactive object 140 is shown. The view 400 may provide an example of the reactive object 140 implemented as a pair of eyeglasses. A rear view of the eyeglasses 140 are shown. The eyeglasses 140 may comprise the frames 200, the arms 202a'-202b' and/or the lenses 204a-204b.

Generally, the temple parts (e.g., arms) of eyeglasses may be designed to fold over top of each other (e.g., the right arm folds over top of the left arm, or the left arm folds over top of the right arm). Folding the temple parts over top of each other enables compact storage of eyeglasses. However, when the temple parts are folded over top of each other, the top arm (e.g., the right arm) may substantially block light from reaching the bottom arm (e.g., the left arm). If the one temple part blocks the light from reaching another temple part, the temple parts may block the UV lights 130a-130n from activating the photochromic ink 142 and/or the colored lights 132 from deactivating color channels of the photochromic ink 142 when the reactive object 140 is in the container 102.

A modified fold 402 is shown. The eyeglasses 140 may implement the modified fold 402 of the arms 202a'-202b'. The modified fold 402 may enable the arms 202a'-202b' to fold to enable a compact state for the eyeglasses 140 so that the eyeglasses may fit within the container 102 (e.g., the container 102 may be implemented to appear similar to a standard case for eyeglasses).

The modified fold 402 may be implemented by angling the arms 202a'-202b' slightly downwards. The slight downwards angle of the arms 202a'-202b' may limit an amount of crossover area of the arms 202a'-202b'. The limited crossover area of the modified fold 402 may enable the UV lights 130a-130n and/or the colored lights 132 to reach the surface of more of the arms 202a'-202b' compared to a conventional fold. By exposing more of the surface area of the arms 202a'-202b' to the UV lights 130a-130n and/or the colored lights 132, the result of the photochromic ink (e.g., after activation and deactivation) may appear consistent (e.g., a relatively even application of light to all surfaces of the eyeglasses 140).

In the example shown, the modified fold 402 may be applicable to the arms 202a'-202b' when the reactive object 140 is implemented as eyeglasses. Other types of reactive objects may have similar overlapping issues that may affect the exposure to the UV lights 130a-130n and/or the colored lights 132 of some portion(s) of the reactive object 140. For example, earbuds may have portions that curl to secure to the ear of the user, which may result in an overlap. Similar types of modifications such as the modified fold 402 may be applied to other types of reactive objects with inherently different shapes (e.g., earbuds, watches, etc.) based on the design criteria of a particular implementation.

In some embodiments, the control circuit 106 may determine an amount of time to apply the light elements 104 for each orientation of the arms 202a'-202b'. The control circuit 106 may generate a sound output to the speakers 110 to indicate when to change the orientation of the arms 202a'-202b'. For example, the control circuit 106 may determine that the UV lights 130a-130n may activate the photochromic ink 142 for two minutes with one orientation (e.g., the right arm 202a' folded over the left arm 202b'), then play the notification from the speaker 110 to indicate to the user to change the orientation of the arms 202a'-202b' (e.g., so that the left arm 202b' is folded over the right arm 202a'), then continue applying the UV lights 130a-130n for another two minutes in the changed orientation. Then the control circuit 106 may apply the colored lights 132 for two minutes and then the notification may be played again so that the user may change the orientation of the arms back to the original orientation (e.g., the right arm 202a' folded over the left arm 202b') and then continue applying the colored lights 132 for another two minutes.

Figure 10:
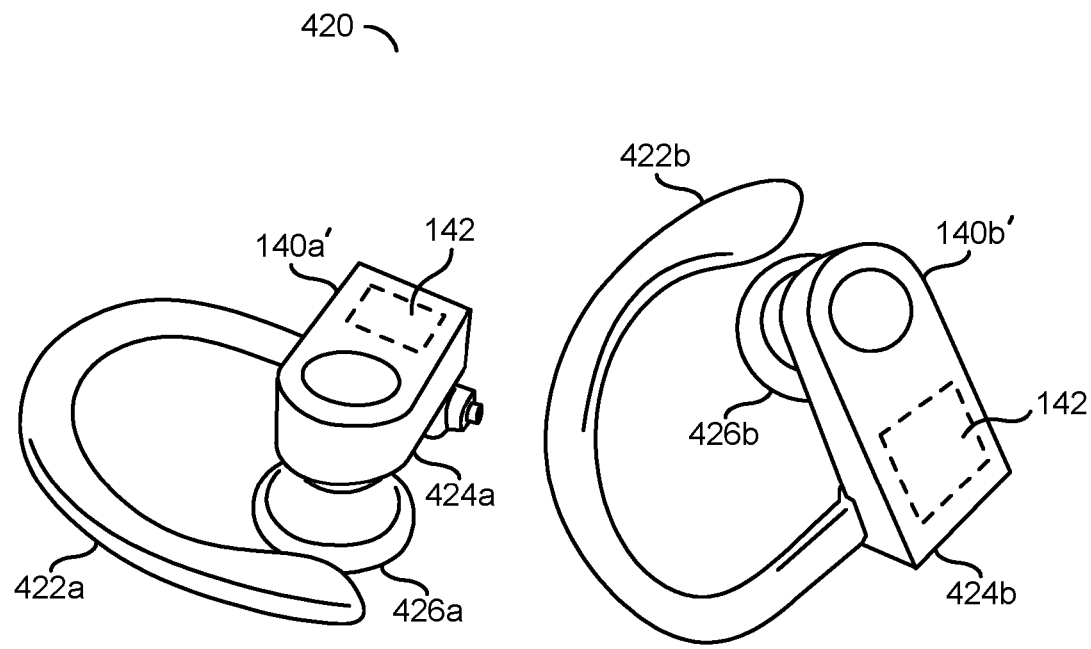
FIG. 10 is a diagram illustrating an embodiment of the present invention in the context of earbuds.

Referring to FIG. 10, a diagram illustrating an embodiment of the present invention in the context of earbuds is shown. An embodiment 420 is shown. The embodiment 420 may comprise reactive components 140a'-140b'. In the example shown, the reactive components 140a'-140b' may be earbuds.

The reactive earbuds 140a'-140b' may comprise respective ear hooks 422a-422b, housings 424a-424b and/or speakers 426a-426b. The ear hooks 422a-422b may support the reactive earbuds 140a'-140b' on the ears of the user. The housings 424a-424b may comprise the electronics for playing audio (e.g., a battery, an audio processor, a Bluetooth communication device, etc.). The speakers 426a-426b may fit into the ears of the users and output the audio.

The housings 424a-424b are shown comprising the photochromic ink 142. In some embodiments, the ear hooks 422a-422b and/or the speakers 426a-426b may also comprise the photochromic ink 142. However, when the reactive earbuds 140a'-140b' are worn, the ear hooks 422a-422b may be hidden from view behind the ears of the user and the speakers 426a-426b may be hidden from view inside the ears of the user (e.g., a color and/or design of the earhooks 422a-422b and/or the speakers 426a-426b may be irrelevant). Generally, the housings 424a-424b are visible when the earbuds 140a'-140b' are worn.

The photochromic ink 142 applied to the housings 424a-424b (and/or other components) of the reactive earbuds 140a'-140b' may enable the user to select the desired color/design. The container 102 may be configured to fit the reactive earbuds 140a'-140b' inside. The UV lights 130a-130n may activate the photochromic ink 142 and then the colored lights 132 may deactivate specific color channels of the photochromic ink 142 (e.g., similar to the example shown in association with FIG. 8).

Reactive earbuds 140a'-140b' may be one example implementation of the system 100. In another example, the system 100 may be implemented with the reactive object 140 implemented as a watch. In yet another example, the system 100 may be implemented with the reactive object 140 implemented as a guitar body. In still another example, the system 100 may be implemented with the reactive object 140 implemented as a helmet (e.g., a bike helmet, a hockey helmet, a football helmet, etc.). In another example, the system 100 may be implemented with the reactive object 140 implemented as various types of sports equipment (e.g., a hockey stick, a ski pole, a skateboard, skis, a snowboard, etc.). In yet another example, the system 100 may be implemented with the reactive object 140 implemented as a drink koozie. The type of the reactive object 140 implemented may be varied according to the design criteria of a particular implementation.

Figure 11:
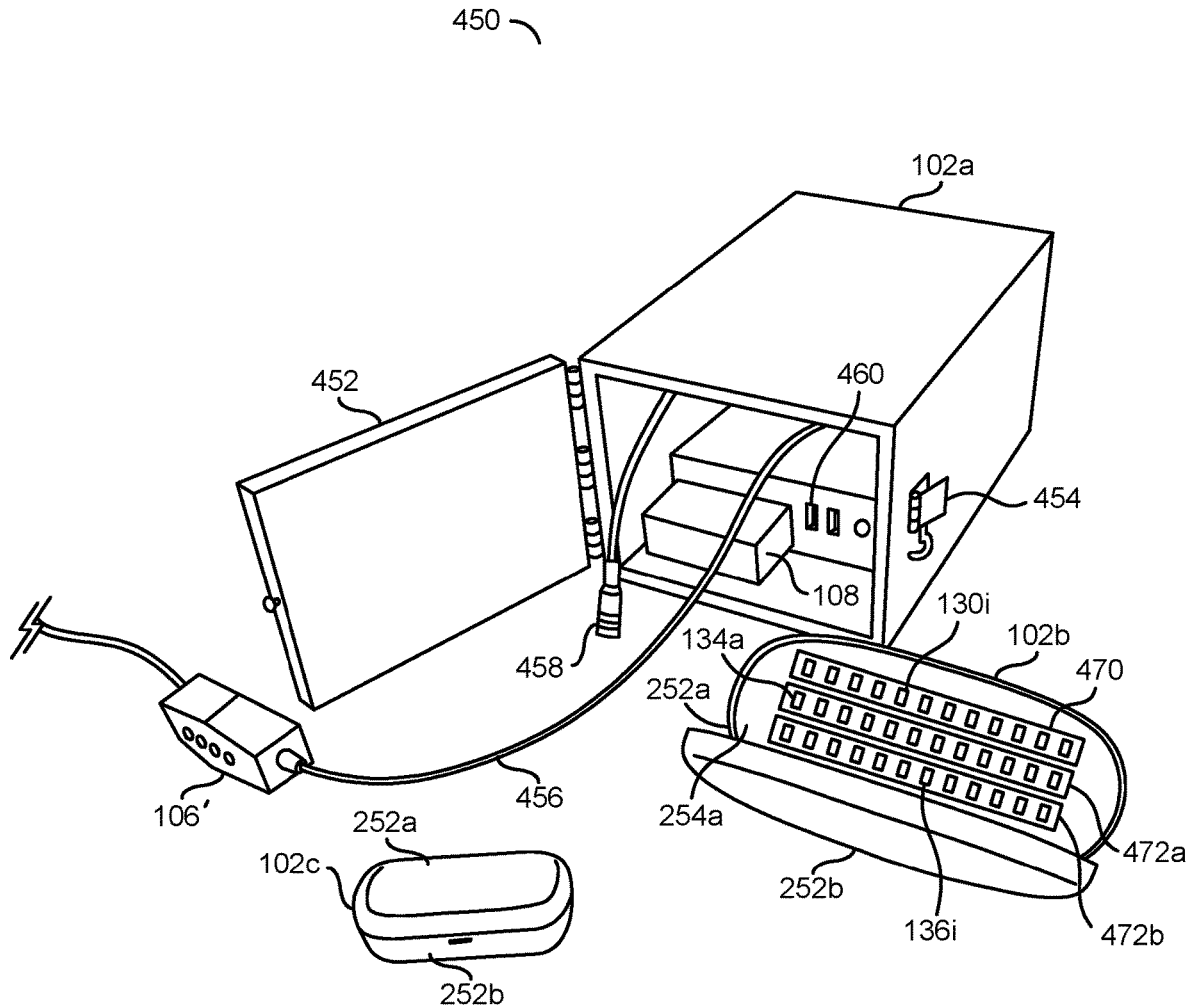
FIG. 11 is a diagram illustrating various sizes of containers.

Referring to FIG. 11, a diagram illustrating various sizes of containers is shown. A view 450 of multiple containers 102a-102c is shown. The containers 102a-102c may represent various embodiments of the container 102 of the system 100. The container 102a may be a relatively larger size. The container 102b may be a container approximately the size of an eyeglasses container (e.g., 6 inches wide, 3 inches deep and 2 inches in height). The container 102c may be a container approximately the size of the reactive earbuds 140a'-140b' (e.g., 3 inches wide, 2 inches deep and 2 inches in height).

The containers 102a-102c may be representative examples of various sizes of containers that may be implemented by the system 100. The containers 102a-102c may be designed according to the size of the various reactive objects 140 that have the photochromic dye/ink 142. For example, a container with a similar size as the container 102c may be used for a watch. In another example, one of the containers 102a-102c may be long and narrow to fit sports equipment (e.g., a ski pole or a hockey stick) implemented with the photochromic dye/ink 142. In yet another example, one of the containers 102a-102c may have the size of a guitar case for a guitar implemented with the photochromic dye/ink 142. The size and/or shape of the container 102 may be varied according to the design criteria of a particular implementation.

The container 102a is shown having a lid 452. A latch 454 may be implemented to secure the lid 452. Securing the lid 452 may enable the light elements 104 to activate and/or deactivate the photochromic ink 142 on the reactive object 140 when the reactive object 140 is within the container 102a without allowing external light sources into the container 102a. The lid 452 may enable the container 102a to be implemented as a box.

The power source 108 is shown within the container 102a. In the example shown, the power source 108 may be a battery and a driver circuit for the light elements 104. The control circuit 106' is shown outside of the container 102a. In the example shown, the control circuit 106' may be a manual switch. For example, the control circuit 106' may provide an interface for enabling the user to manually adjust the light elements 104 (e.g., turn on/off the UV lights 130a-130n and/or the colored lights 132, select a color combination for the colored lights 132, select an intensity of the UV lights 130a-130n and/or the colored lights 132, etc.).

A cable 456 is shown connected to the control circuit 106'. A connector 458 is shown at one end of the cable 456. In one example, the connector 458 may be a USB plug. A port 460 is shown on the power source 108. The port 460 may be part of the input/output 116 of the container 102a. In an example, the port 460 may be a USB port. For example, the connector 458 may connect to the port 460. The connection of the connector 458 to the port 460 may enable the power supply 108 to receive input from the control circuit 106'. In an example, the input received by the control circuit 106' may be sent to the power supply 108 via the cable 456 and the power supply 108 may adjust the light elements 104 in response to the input from the control circuit 106'.

The container 102b is shown having the outer shell 252a-252b. The outer shell 252a-252b may enable the container 102b to be implemented as a clamshell container. The container 102b is shown with the outer shell 252a-252b opened. The inner surface 254a is shown with the outer shell 252a-252b opened.

A light strip 470 is shown on the inner surface 254a. The light strip 470 may comprise the UV lights 130a-130n (only the UV light 130i is labeled for clarity). Light strips 472a-472b are shown on the inner surface 254a. The light strips 472a-472b may comprise the colored lights 132 (only the colored LED 134i and the colored LED 136i are labeled for clarity). The colored LEDs 134a-134n and the colored LEDs 136a-136n may be arranged throughout either one of the light strips 472a-472b. In the example shown, the individual LEDs for the UV lights 130a-130n and/or the colored lights 132 are shown. In some embodiments, the light strip 470 and/or the light strips 472a-472b may be covered with a cover (e.g., to appear as a light bar).

In an example, the power supply 108 may be connected to the light strip 470 and the light strips 472a-472b. The control circuit 106' may receive input to determine which of the light elements 104 to activate. The control circuit 106' may present a signal to the power supply 108 and the driver circuit of the power supply 108 may provide an appropriate amount of power to one or more of the light strip 470 and/or the light strips 472a-472b.

The container 102c is shown having the outer shell 252a-252b. The outer shell 252a-252b may enable the container 102a to be implemented as a clamshell container. The container 102c is shown with the outer shell 252a-252b closed. For example, the reactive earbuds 140a'-140b' may be within the container 102c and the light elements 104 may be applying the light to select the color/design for the photochromic ink 142.

Figure 12:
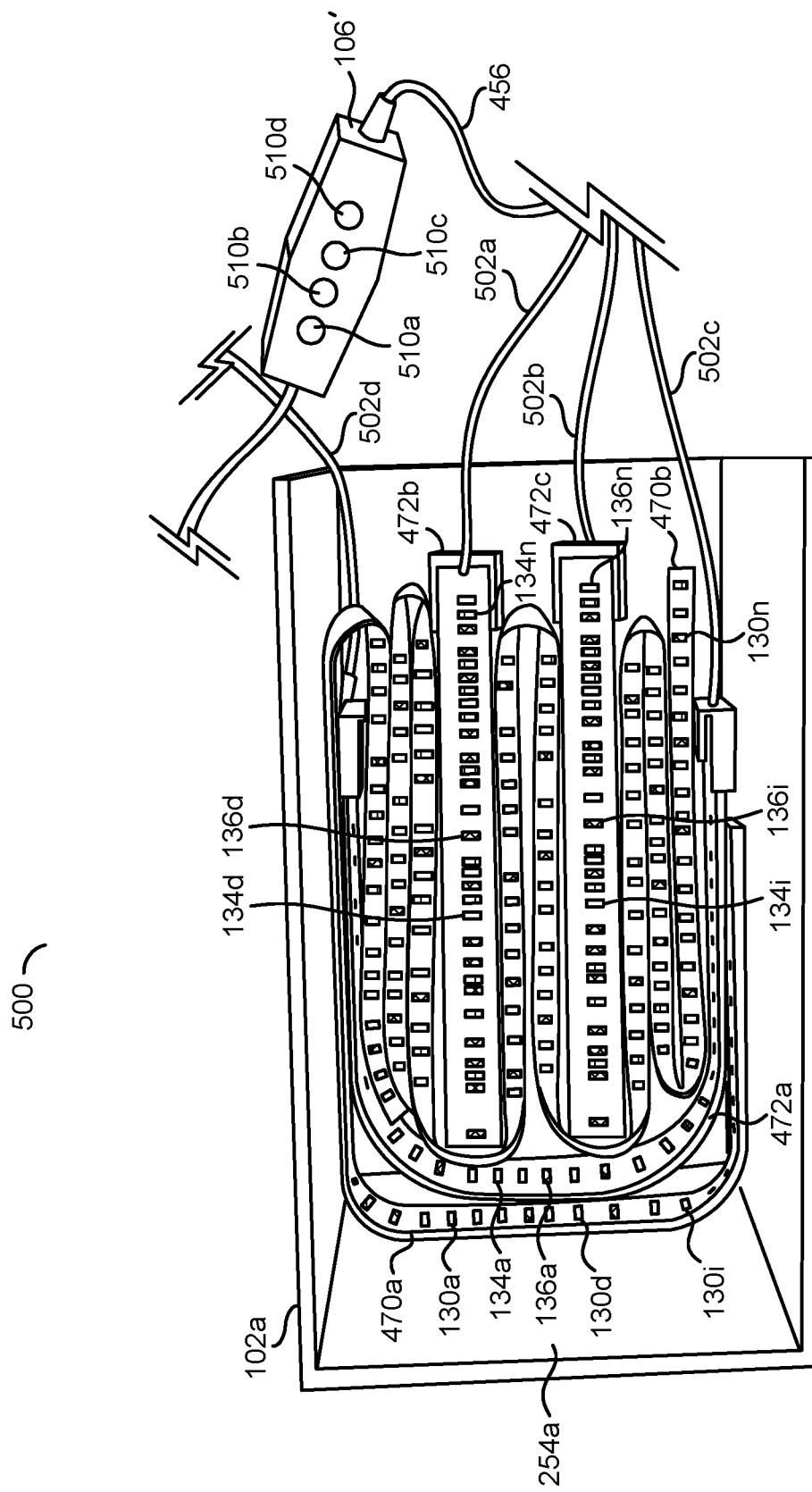
FIG. 12 is a diagram illustrating lights implemented in the interior of a container.

Referring to FIG. 12, a diagram illustrating lights implemented in the interior of a container is shown. A view 500 is shown. The view 500 may comprise an interior view of the container 102a (described in association with FIG. 11). The interior view 500 may comprise the inner surface 254a of the container 102a. The interior view 500 may comprise the light strips 470a-470b and the light strips 472a-472c. The interior view 500 may comprise the manual control circuit 106' and the cable 456. The manual control circuit 106' is shown outside of the container 102.

The light strips 470a-470b are shown routed throughout the inner surface 254a (e.g., on each side of the inner surface). The light strips 470a-470b may comprise the UV lights 130a-130n. Routing the light strips 470a-470b throughout the inner surface 254a may enable the ultraviolet light generated by the UV lights 130a-130n to be applied to the reactive object 140 from various different angles.

The light strips 472a-472c are shown routed throughout the inner surface 254a (e.g., on each side of the inner surface). The light strips 472a-472c may comprise the colored LEDs 134a-134n and/or the colored LEDs 136a-136n. Routing the light strips 472a-472c throughout the inner surface 254a may enable the visible and/or invisible light generated by the colored LEDs 134a-134n and/or the colored LEDs 136a-136n to be applied to the reactive object 140 from various different angles.

The colored LEDs 134a-134n and the colored LEDs 136a-136n are shown on each of the light strips 472a-472c. In one example, the colored LEDs 134a-134n may be arranged to alternate with the colored LEDs 136a-136n (e.g., the colored LED 134a may be next to the colored LED 136a and the colored LED 134b may be next to the colored LED 136a, etc.). In another example, the colored LEDs 134a-134n may be randomly arranged throughout the colored LEDs 136a-136n. Generally, the colored LEDs 134a-134n and the colored LEDs 136a-136n may be arranged to provide visible light coverage to all sides of the reactive object 140 when the colored lights 132 are emitting light. The arrangement of the colored LEDs 134a-134n and the colored LEDs 136a-136n may be varied according to the design criteria of a particular implementation.

A wire 502a is shown connected to the light strip 472b. A wire 502b is shown connected to the light strip 472c. A wire 502c is shown connected to the light strip 472a. A wire 502d is shown connected to the light strip 470a. The wires 502a-502d may be connected to the power supply 108 (not shown). The wires 502a-502d may provide signals to the light strips 470a-470b and/or 472a-472c. For example, the manual control circuit 106' may provide information about the intensity and/or wavelength of the light emission for the lighting elements 104 and the cable 456 may transmit the information to the power supply 108. The power supply 108 may provide input signals to the light strips 470a-470b and/or 472a-472c over the wires 502a-502d to activate, deactivate and/or adjust the light output by the UV lights 130a-130n, the colored LEDs 134a-134n and/or the colored LEDs 136a-136n.

The manual control circuit 106' may comprise buttons 510a-510d. The buttons 510a-510d may enable a user to select the output for the light elements 104. In one example, the buttons 510a-510d may be configured to enable the user to select a color (e.g., red) and the control circuit 106' may determine the appropriate settings for the UV lights 130a-130n and/or the colored lights 132 to alter the photochromic ink 142 to a red color. In another example, the buttons 510a-510d may be configured to enable the user to select an intensity of light, a length of time to emit the light and/or the wavelength of the light generated by the UV lights 130a-130n and/or the colored lights 132 (e.g., the user may select red for five minutes, and the control circuit 106' may deactivate the UV lights 132a-132n and adjust the colored lights 132 to emit a red color, which may result in the cyan color channel of the photochromic ink 142 being deactivated. The type of input received by the manual control circuit 106' and/or the type of output signal generated by the manual control circuit 106' may be varied according to the design criteria of a particular implementation.

In the example shown, the colored lights 132 may comprise two types of colored LEDs (e.g., the colored LEDs 134a-134n and the colored LEDs 136a-136n). The deactivation of color channels of the photochromic ink 142 may react to particular wavelengths of visible light. In some embodiments, three types of colored LEDs may be implemented (e.g., red, green and blue lights). In the example shown, two types of colored LEDs may be implemented, and the control circuit 106 may blend the amount of color generated by each of the colored LEDs 134a-134n and the colored LEDs 136a-136n and the amount of time to apply the blend of color to achieve particular wavelengths for deactivating color channels of the photochromic ink 142.

Figure 13:
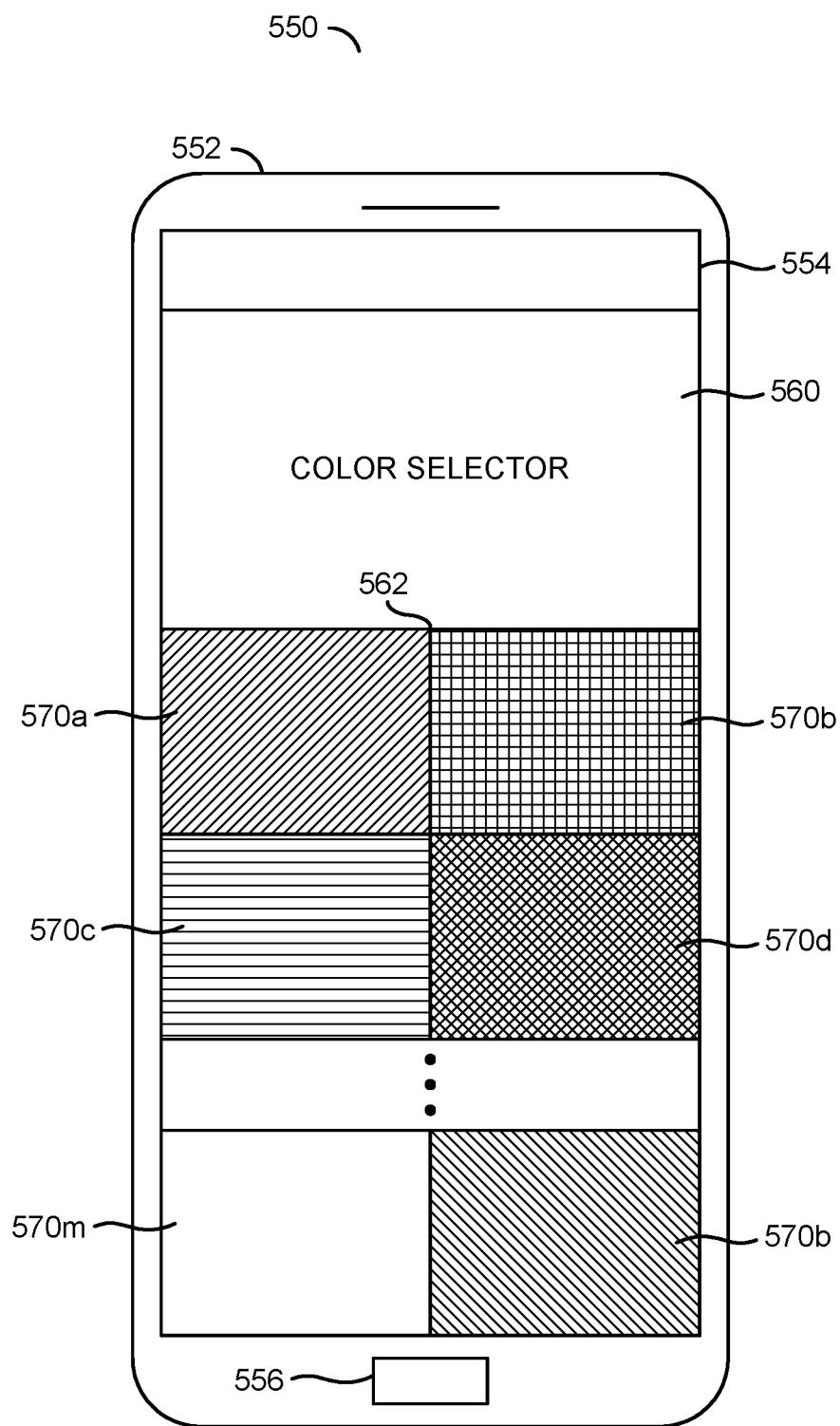
FIG. 13 is a diagram illustrating color selection using a smartphone companion app.

Referring to FIG. 13, a diagram illustrating color selection using a smartphone companion app is shown. An example color selection option 550 is shown. The example color selection option 550 may be implemented using a companion app for a smartphone. In another example, a companion app may be implemented for a smartwatch, a desktop computer (e.g., a Windows/MacOS/Linux program) and/or a dedicated control device. The type of device implementing the companion app may be varied according to the design criteria of a particular implementation.

A smartphone 552 is shown. The smartphone 552 may be a remote device configured to provide an input signal to the container 102. The smartphone 552 may comprise a touchscreen interface 554 and/or a button 556. The touchscreen interface 554 may be configured to receive user input (e.g., touches, taps, gestures, etc.) and/or display video output. The button 556 may be configured to receive input.

The touchscreen interface 554 is shown displaying a companion app 560. The companion app 560 may be configured to work with the system 100. In an example, the smartphone 552 may be configured to communicate with the system 100 using the communication device 112. In an example, the companion app 560 may be configured to read data from an application-program interface (API) provided by the communication device 112 and/or the control circuit 106 (e.g., to display information about the status of the light elements 104, an amount of time remaining for the steps 380a-380c, an amount of power remaining in the battery 108, etc. In another example, the companion app 560 may be configured to accept input from a user and provide the input to the API (e.g., to select a color for the photochromic ink 142 and/or to directly control the light elements 104). The capabilities of the companion app 560 may be varied according to the design criteria of a particular implementation.

The companion app 560 may provide a color selector 562. The color selector 562 may comprise various color options. In one example, the color options of the color selector 562 may be configured to enable the user to select the final result color (or pattern or texture) for the reactive object 140. In another example, the color options of the color selector 562 may be configured to enable the user to select the wavelengths for the visible light generated by the colored lights 132 (e.g., indirect control of the final result color for the reactive object 140).

In the example shown, the color selector 562 may comprise various color options 570a-570n. The user may tap one of the color options 570a-570n and the smartphone 552 may communicate the color selected to the communication device 112. In some embodiments, the color options 570a-570n may comprise preselected colors (e.g., the colors that may be best produced using the photochromic ink 142). In some embodiments, the color options 570a-570n may comprise favorite colors (e.g., colors previously selected by the user). In some embodiments, the color options 570a-570n may comprise any color (e.g., a color wheel providing a gradient of hue/saturation/brightness, an input for hexadecimal color codes, etc.). In the example shown, single color selections are shown. However, the color options 570a-570n may comprise other patterns/designs (e.g., color gradients, patterns, images, etc.). The interface for selecting one of the color options 570a-570n may be varied according to the design criteria of a particular implementation.

In some embodiments, the user may select one of the color options 570a-570n. The companion app 560 may convert the color selection into data readable by the control circuit 106. The smartphone 552 may communicate the data to the system 100 via the communication device 112. The control circuit 106 may read the color selection data. The control circuit 106 may determine the combination of the light elements 104 to apply to generate the selected color as the final result for the photochromic ink 142. The control circuit 106 may determine the amount of time to apply the UV lights 130a-130n and/or the colored lights 132. The control circuit 106 may communicate signals to the UV lights 130a-130n, the colored LEDs 134a-134n and/or the colored LEDs 136a-136n to perform the activation/deactivation of the photochromic ink 142. When the amount of time for applying the UV lights 130a-130n and/or the combination of the colored LEDs 134a-134n and/or the colored LEDs 136a-136n has passed, the control circuit 106 may generate notification data. The notification data may be generated in a format readable by the companion app 560. The notification data may be communicated by the communication device 112 to the smartphone 552. The companion app 560 may generate a notification to indicate to the user that the reactive object 140 is ready (e.g., the color/design has been achieved).

Figure 14:
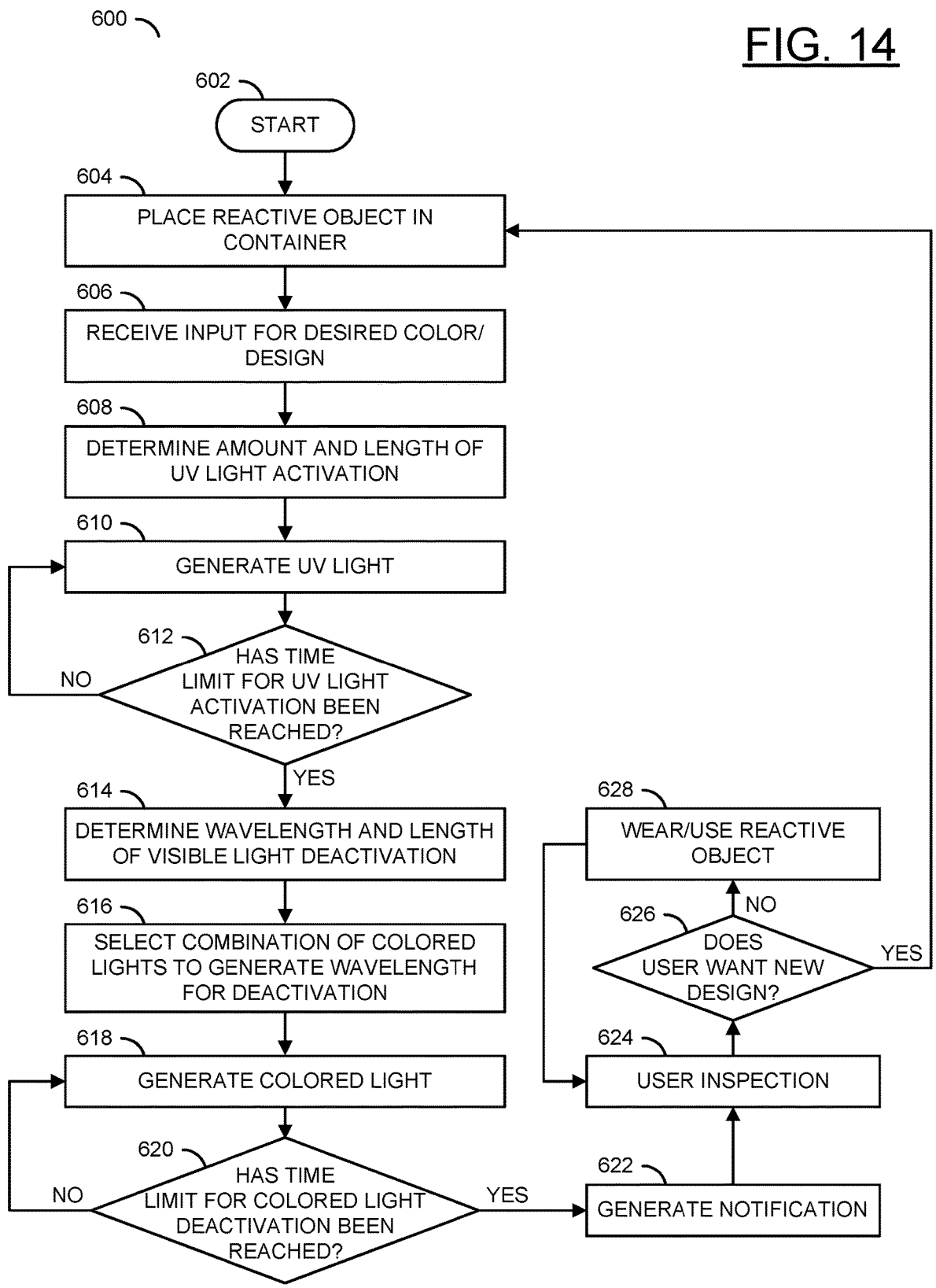
FIG. 14 is a flow diagram illustrating a method for applying a desired color to a reactive object.

Referring to FIG. 14, a method (or process) 600 is shown. The method 600 may apply a desired color to a reactive object. The method 600 generally comprises a step (or state) 602, a step (or state) 604, a step (or state) 606, a step (or state) 608, a step (or state) 610, a decision step (or state) 612, a step (or state) 614, a step (or state) 616, a step (or state) 618, a decision step (or state) 620, a step (or state) 622, a step (or state) 624, a decision step (or state) 626, and a step (or state) 628.

The step 602 may start the method 600. In the step 604, the user may place the reactive object 140 into the container 102. Next, in the step 606, the control circuit 106 of the container 102 may receive an input for a desired color/design for the reactive object 140. In one example, the control circuit 106 may read an input received from the companion app 560. In another example, the user may provide the input using the manual control circuit 106'. In still another example, the user may provide the input using another type of device connected via the input/output port 116. Next, the method 600 may move to the step 608.

In the step 608, the control circuit 106 may determine the amount and/or length of UV light activation. The amount and/or length of UV light activation may be determined in response to the desired color/design selected by the user. The control circuit 106 may determine the characteristics of the UV lights 130a-130n. Next, in the step 610, the UV lights 130a-130n may generate the UV light onto the reactive object 140. The UV light may activate the photochromic ink/dye 142 of the reactive object 140. For example, the control circuit 106 may activate the driver circuit of the UV lights 130a-130n according to the characteristics determined. Next, the method 600 may move to the decision step 612.

In the decision step 612, the control circuit 106 may determine whether the amount of time for the UV light activation has been reached. For example, the characteristics of the UV lights 130a-130n determined may comprise an amount of time, and the control circuit 106 may track the amount of time that the UV lights 130a-130n have been activated. The amount of time may be determined by the control circuit 106 in response to desired color/design selected by the user. If the amount of time has not been reached, then the method 600 may return to the step 610 (e.g., the UV light generated by the UV lights 130a-130n may continue to be applied to the reactive object 140). If the amount of time has been reached, then the method 600 may move to the step 614.

In the step 614, the control circuit 106 may determine a wavelength and/or length (e.g., amount of time) for applying the visible light for the deactivation of the color channels of the photochromic ink 142. The control circuit 106 may determine the characteristics of the colored lights 132 in response to the color/design selected by the user. Next, in the step 616, the control circuit 106 may select a combination of the colored lights 132 in order to generate the wavelength for the deactivation of the color channels of the photochromic ink 142. The control circuit 106 may determine the characteristics of the colored LEDs 134a-134n and/or the colored LEDs 136a-136n (e.g., a combination of colors to emit) in order to achieve the wavelength. In the step 618, the colored LEDs 134a-134n and/or the colored LEDs 136a-136n may generate the colored light (e.g., the light at the determined wavelength in the visible spectrum of light) to be applied onto the reactive object 140. The colored light may deactivate pre-determined color channels of the photochromic ink/dye 142 of the reactive object 140. For example, the control circuit 106 may activate the driver circuit of the colored LEDs 134a-134n and/or the colored LEDs 136a-136n according to the characteristics determined. Next, the method 600 may move to the decision step 620.

In the decision step 620, the control circuit 106 may determine whether the amount of time for the colored light deactivation has been reached. For example, the characteristics of the colored LEDs 134a-134n and/or the colored LEDs 136a-136n determined may comprise an amount of time, and the control circuit 106 may track the amount of time that the colored LEDs 134a-134n and/or the colored LEDs 136a-136n have been activated. The amount of time may be determined by the control circuit 106 in response to desired color/design selected by the user. If the amount of time has not been reached, then the method 600 may return to the step 618 (e.g., the visible and/or invisible spectrum light generated by the colored LEDs 134a-134n and/or the colored LEDs 136a-136n may continue to be applied to the reactive object 140) If the amount of time has been reached, then the method 600 may move to the step 622.

In the step 622, the control circuit 106 may generate a notification. The notification may indicate that the application of the selected color has been completed. In one example, the notification may be an audio tone and/or message generated by the speakers 110. In another example, the notification may be provided by a LED implemented on the external portion of the container 102 (e.g., a green light indicating the reactive object 140 is ready). In yet another example, the notification may be generated by the communication device 112 to provide a message (e.g., a push notification) that may be presented by the companion app 560. Next, in the step 624, the user may remove the reactive object 140 from the container 102 for inspection (e.g., to ensure that the final result of the color/design is as desired). Next, the method 600 may move to the decision step 626.

In the decision step 626, the user may determine whether a new design/color is desired. In one example, the user may desire a new color/design for the reactive object 140 if the output was not as expected. In another example, the user may desire a new color/design for the reactive object 140 is the color/design has faded (e.g., faded over time while being worn/used). In yet another example, the user may desire a new color/design because the user wants a change in style. If the user does not want a new design, then the method 600 may move to the step 628. In the step 628, the user may wear/use the reactive object 140. Next, the method 600 may return to the step 624 (e.g., the user may decide to change the color/design at any time). In the decision step 626, if the user does want a new design, then the method 600 may return to the step 604. For example, the user may repeat the steps 604-628 in order to select and/or apply a new color/design. The selecting and/or applying of a new color/design for the reactive object 140 may be repeated as many times as desired by the user.

Photochromatic dye may be a type of reactive material that may change color when exposed to various characteristics of light (e.g., wavelengths that may comprise light in the ultraviolet spectrum and light in the visible spectrum). Applying the reactive material to a variety of objects (e.g., clothing, eyewear, headphones, watches, earbuds, etc.) may provide a dynamic and visually appealing appearance. Generally, to ensure that a desired color is generated, a controlled environment may be implemented. The controlled environment may ensure that altering the aesthetics of photochromatic dye-coated objects is performed using natural or artificial UV light sources that may provide the desired outcome. For example, a case and/or a container may be used as a controlled environment. Details of the controlled environment may be described in association with U.S. patent application Ser. No. 17/089,615, filed on Nov. 4, 2020, appropriate portions of which are incorporated by reference.

Embodiments of the present invention may enable changing the aesthetics of objects that have the reactive material that may be too large to fit inside a case and/or container. In an example, large and/or irregularly shaped objects may be inconvenient and/or impractical to fit inside a case (or the case may be too large to be carried by a person). Similarly a single-use container that applies the light to the reactive material for an irregularly shaped object may be uneconomical (e.g., a small container may be used for many small accessories, but a uniquely shaped case may not be usable by multiple objects and/or may be limited in terms of control and customization). Embodiments of the present invention may be configured to apply the light with the particular light characteristics to objects such as wall paper, a canvas, a sticker, backpack, a guitar, skateboard, car, decals, furniture, etc. Embodiments of the present invention may be configured to enable a user to have flexibility in changing the appearance of multiple types of objects.

Embodiments of the present invention may be implemented as a portable (or mobile) device that may apply light with particular characteristics to many different types of objects of varying sizes and/or proportions that comprise the reactive material. In one example, embodiments of the present invention may be implemented as a portable light source that may utilize both LED and UV wavelengths (e.g., 250 nm-1000 nm) to alter the aesthetics of objects coated in the reactive material (e.g., photochromatic dye). The portable light source may comprise a power source, a controller, a light source (e.g., LED lights), and a UV light source implemented within (or partially within) a housing. The LED light source may be capable of emitting a range of wavelengths of light in the visible spectrum. The UV light source may be capable of emitting a range of wavelengths in the UV spectrum. The controller (or control system) may be configured to selectively activate and/or deactivate the LED light source and the UV light sources. The controller may be configured to adjust an intensity of the light emitted. The portable light source may be configured to change the color and/or appearance of objects comprising the reactive material in a customizable and convenient manner by exposing the objects to different combinations of LED and UV light.

Generally, to induce a particular change in color and/or desired color outcome, light with particular characteristics may be applied to the reactive material for a set amount of time. The controller may be configured to determine the set amount of time to apply each type of light characteristics. The set amount of time may depend upon various factors that may be provided as an input to the controller (e.g., ambient light in environment, desired color outcome, a current color of the reactive material, etc.).

Embodiments of the present invention may be configured to pair with a remote device. In one example, the remote device may be a smartphone and the pairing may be performed via WI-FI and/or Bluetooth. In an another example, the remote device may be a tablet computing device and/or a computer (e.g., a desktop computer, a laptop, a notebook, a netbook, etc.). The remote device may provide an interface (e.g., a selection screen) to aid the user in determining a desired color and/or appearance of the reactive material.

In some embodiments, the portable light source may implement an input interface. In an example, the input interface may comprise a physical dial and/or buttons. In another example, the input interface may comprise a touchscreen interface. The input interface may enable the portable light source to manage the color change of the reactive material as a standalone device.

Embodiments of the present invention may be configured to apply light to various sized and/or shaped objects by incorporating an adjustable focus and/or zoom feature for the light sources. The focus and/or zoom feature may enable users to adjust the width, shape, concentration, pattern and/or intensity of the LED and UV light beams emitted by the light source. Shaping the beams of the light sources may enable the light to be applied to different types of objects and/or different shapes of surfaces of the objects.

Implementing a portable light source may enable flexibility in applying the light to various objects. In an example, a light source provided in a container may be limited to specific locations and/or specific shapes/sizes of objects. The portable light source embodiment may be easily carried for use in a variety of different environments. The portable light source may enable users to change the color of objects having the reactive material whenever and/or wherever desired (e.g., change a color of an object on-the-fly without a fixed and stationary light source). Since the portable light source is not constrained by a specific container, objects of varying sizes and/or shapes may be used with the reactive material for greater versatility. The position and/or orientation of the portable light source may be adjusted for greater flexibility in applying light at particular angles (e.g., to ensure that light may be applied to difficult to reach surfaces).

Embodiments of the present invention may comprise a user interface, a display, speakers, a microphone, wireless connectivity and/or may support a variety of attachments and/or add-on features. The add-on features may comprise a sensor, a spectrometer, reflectors, filters, diffusers, beamformers, a wireless communication device, a blinder, a mounting attachment, a robotic arm attachment, etc. A reflector may direct the light sources towards the objects, a diffuser may evenly distribute the light, the filter may modify the color and/or intensity of the light, the blinder may create an enclosed environment around the light source, the mounting system (or station) may securing the light sources to a fixed surface and/or object to keep the application of light constant, the robotic arm (or other automated mechanism) may be configured to hold and/or position the light source in a precise manner. The type and/or combination of add-ons implemented may be varied according to the design criteria of a particular implementation.

Embodiments of the present invention may be energy efficient. The visible light and/or UV light sources may be generated by LEDs. The LEDs may be energy-saving devices that have a long lifespan. Energy efficient light sources may enable long use on a single charge of the power source, reduce operating costs and/or be environmentally friendly.

Exposing different combinations of light characteristics (e.g., visible spectrum and UV spectrum light wavelengths), the reactive material (e.g., photochromatic dye) may undergo a color change, resulting in a new appearance for the object. The user may customize the color and/or appearance of objects coated in the reactive material in a convenient and controllable manner. The portable light source may be suitable for use on a wide variety of objects coated in photochromatic dye (e.g., clothing, eyewear, earbuds, bracelets, earrings, necklaces, other accessories, etc.). The objects may vary in shape and/or size. The portable light source may provide flexibility in applying the light in order to accommodate the differences in the objects. The light sources may be capable of emitting a wide range of wavelengths, to enable users to achieve a variety of aesthetic effects on different types of photochromatic dye-coated objects.

In some embodiments, the portable light source may be configured to maintain and/or restore an original color of the objects. By exposing the objects to the appropriate light characteristics, users may ensure that the color of the reactive material remains vibrant and consistent over time.

The housing implemented may contain one or more of the power source, the visible light source, the UV light source and/or the control system. The visible light source and/or the UV light source may be implemented partially within the housing (e.g., to receive control signals for selecting the light characteristics) and partially outside the housing (e.g., to emit the light towards the reactive material). The control system may selectively activate and deactivate the light sources and/or adjust the intensity of the light emitted. The visible light source may be capable of emitting visible light at a range of wavelengths, and the UV light source may be capable of emitting UV light at a range of wavelengths. A focus, zoom and/or light intensity selection feature may be implemented in order to tailor the characteristics of the light specific to the size and shape of the objects, as well as the environment in which the light source is used. A user interface, display, and/or wireless connectivity may be implemented, which may provide users with a convenient and intuitive experience when altering the aesthetics of the objects. The portable light source of the present invention may provide a versatile, feature-rich, and/or convenient solution for altering the aesthetics of photochromatic dye-coated objects and enable an ability for end users to change the color and/or appearance of objects in a variety of different environments and situations.

The portable light source embodiment may be configured to provide control and customization for changing aesthetics of reactive objects. The control system may enable users to selectively activate and deactivate the LED and UV light sources, as well as adjust the intensity of the light emitted, giving users the ability to create a wide range of aesthetic effects. The versatility provided may enable the portable light source suitable for use in a variety of applications, such as fashion, art, and design. The portable light source may enable personalization, customization and/or a bespoke experience. For example, the aesthetics of the reactive objects may be individualized as desired for each user.

Figure 15:
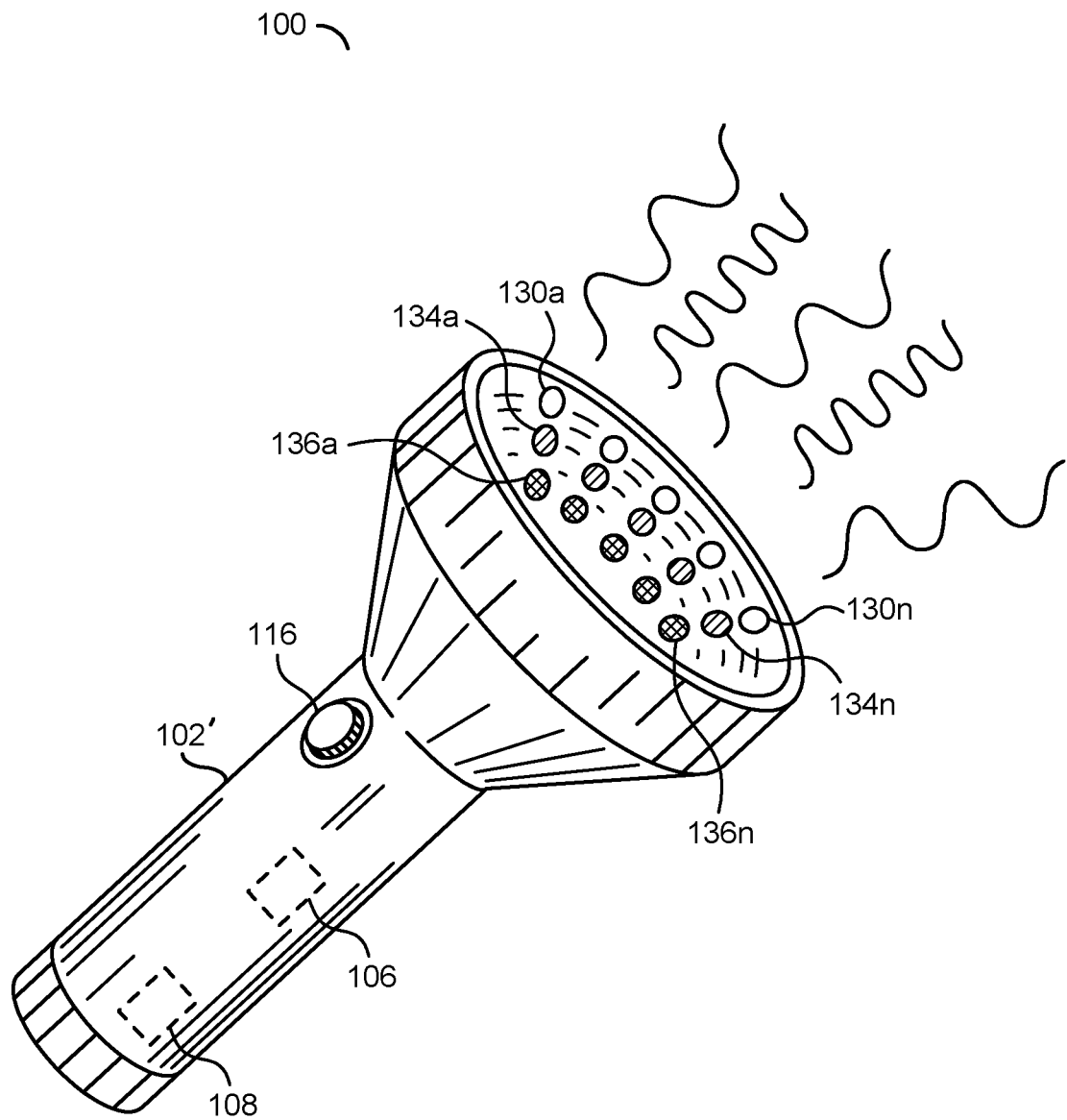
FIG. 15 is a diagram illustrating an example portable embodiment of the present invention.

Referring to FIG. 15, a diagram illustrating an example embodiment of the present invention is shown.

The housing 102 may be made of any suitable material that may contain the various components. In one example, the housing 102 may comprise a plastic material. In another example, the housing 102 may comprise a metal material. The housing 106 may be shaped and sized in a variety of configurations. In one example, the housing 102 may be shaped to fit in the hand of a person. In another example, the housing 102 may be configured to connect to a wearable attachment (e.g., a headlamp).

The power source 108 may be a rechargeable battery, AC adapter, or other suitable power source.

The lights 104 may be configured to produce lights at various wavelengths. Each of the diodes 130a-130n, the diodes 134a-134n and/or the diodes 136a-136n may be configured to generate light at wavelengths at or between 200 nm-1200 nm. The lights 104 may comprise one or more LED chips in order to control the various diodes 130a-130n, 134a-134n and/or 136a-136n. The light 104 may be controlled by the controller 106 to emit light at a variety of wavelengths (e.g., red, orange, yellow, green, blue, indigo, and violet). The light 104 may be configured to provide the UV light source 130a-130n. The UV light source may emit the UV light at a range of wavelengths, and may comprise one or more UV LED chips. The UV light source may be controlled by the controller 106 to emit UV light at a variety of wavelengths (e.g., UVA, UVB, UVC, etc.).

The controller 106 may be configured to selectively activate and deactivate the LED light source 132 and the UV light sources 130a-130n, as well as to adjust the intensity of the light emitted by the light sources. The controller 106 may receive input from the user interface 116. In the example shown, the user interface may comprise a dial. The dial implementation may enable selecting an intensity of the light 104. In some embodiments, the user interface 106 may comprise a button and/or a switch, for activating and deactivating the light sources. In some embodiments, the user interface 116 may comprise a touchscreen interface and/or a display. The display may output information, such as the current settings (e.g., the selected characteristics) of the light sources.

The portable light source 100 may provide a number of practical benefits to users. The shape of the housing 106 may provide convenience and portability of the apparatus 100. The housing 106 may be implemented with a compact size and/or lightweight design. The size and/or weight may enable the portable light source 100 to carried and/or used in a variety of environments. For example, users may alter the aesthetics of the reactive objects 140 on the go.

Figure 16:
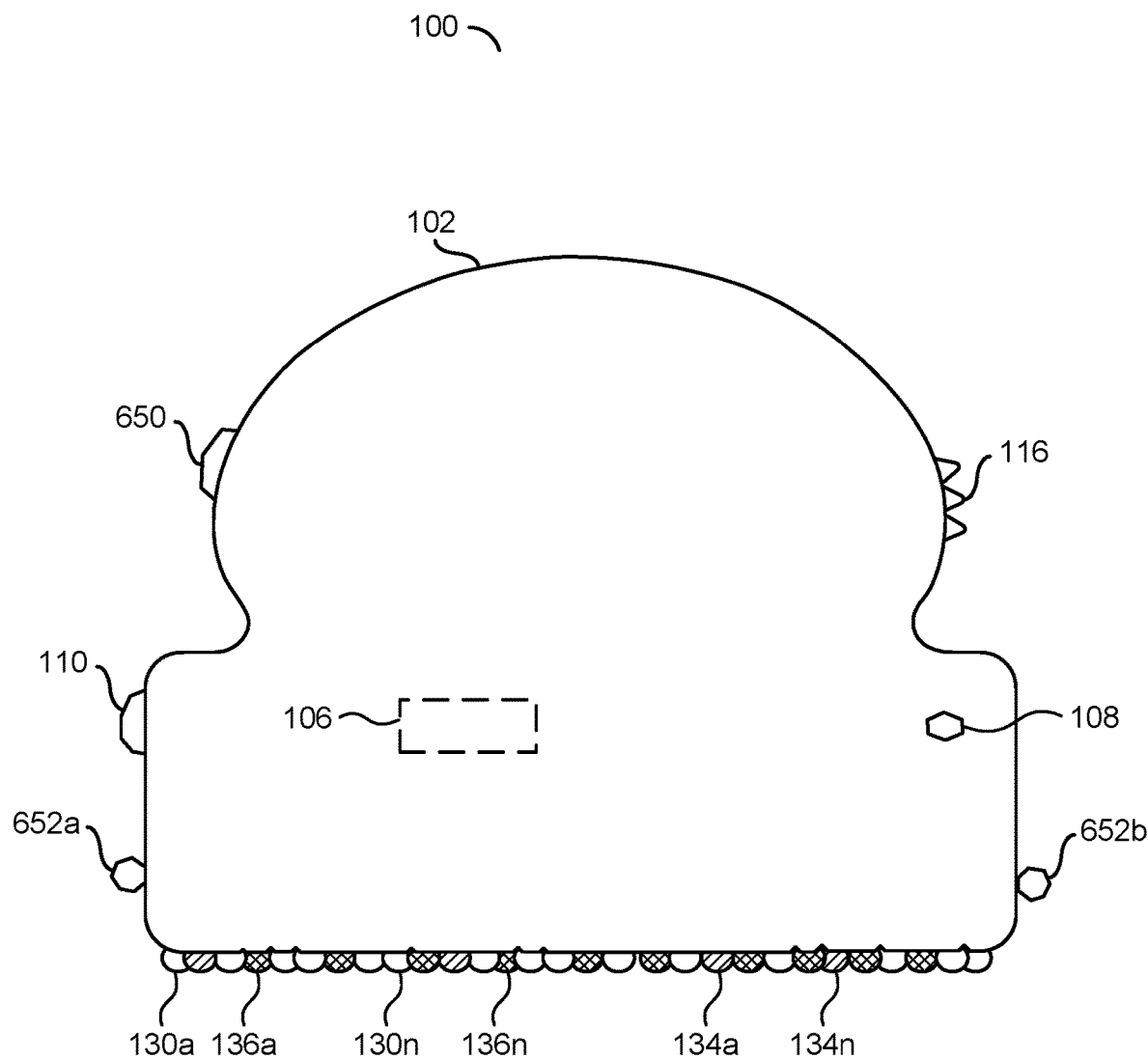
FIG. 16 is a diagram illustrating an alternate portable embodiment of the present invention.

Referring to FIG. 16, a diagram illustrating an alternate portable embodiment of the present invention is shown. The alternate portable embodiment may comprise the housing 102 having a curved shape configured to fit in a palm of one hand of a user. The curved shape of the housing 102 may provide an ergonomic grip for directing the light sources. The UV lights 130a-130n, the colored lights 134a-134n and/or the colored lights 136a-136n may be implemented on an end of the apparatus opposite to the curved shape for the housing 102 to enable the user to direct the light source (e.g., the curved shape of the housing 102 that fits into the palm may be a top of the housing 102 and the lights may be implemented on a bottom of the housing 102).

In the example shown, some of the components may be implemented externally on the housing 102 (e.g., to enable the user to interact with the components) and some of the components may be implemented within the housing 102. The control circuit 106 and/or the power source 108 may be within the housing 102. The speakers 110 may comprise a speaker grille on the housing 102 to enable sound to pass through clearly. The interface 116 may comprise a number of buttons and/or switches on the housing 102. A touchscreen interface 650 is shown on the housing 102. The touchscreen interface 650 may be configured to receive touch input and display information to the user. Attachment locations 652a-652b may be configured to enable various attachments to connect to the housing 102 (e.g., the robotic arm, the stand, the spectrometer, etc.). The attachment locations 652a-652b may comprise mechanical connections to provide a secure physical connection of the attachment to the apparatus 100. The attachment locations 652a-652b may comprise electrical connections to enable the power source 108 to provide power to the attachments.

The portable light source may be configured to measure ambient light wavelengths and/or select an appropriate wavelengths to apply to the photochromatic dye-coated objects. An attachment comprising a sensor (e.g., a spectrometer or spectral sensing device) may be implemented. The spectrometer may be configured to continuously and/or periodically measure the ambient light wavelengths in the environment. The controller may use the information measured.

Based on the ambient light wavelengths measured by the spectrometer, the control system may select appropriate characteristics of the light sources to apply to the reactive objects. In an example, if the ambient light wavelengths are detected in a predominantly blue or green range, the control system may select LED and UV light wavelengths that may be complementary to the wavelengths detected (e.g., red or orange wavelengths). In another example, if the spectrometer detects a high level of UV light in the environment, the control system may automatically adjust the LED and UV light sources to compensate for the high level of UV light in order to achieve the desired color change on the objects. Selecting appropriate light characteristics in response to the measured ambient light may ensure that the color change of the objects is more visible and effective in the given ambient light conditions (e.g., provide consistent results).

After applying the LED and UV light wavelengths to the objects, the control system may then deactivate the light sources, allowing the color change of the objects to be observed. The control system may further enable the users to adjust the intensity and/or duration of the application of the light to achieve the desired aesthetic effect on the reactive objects.

The spectrometer attachment may provide users with an option of measuring and/or adjusting light characteristics in response to the ambient light wavelengths in the particular environment. The spectrometer may be configured to measure the intensity of light as a function of wavelength. The measured light may be used by the controller to determine the wavelengths present in a given environment. Further attachments may be implemented in addition to the spectrometer to aid in the process of changing the aesthetics of the objects.

The portable light source may comprise an attachment configured to adjust a focus (or zoom) of the light. In an example, the attachment may narrow the focus of the light beam(s) to a narrower width for smaller or more detailed objects. A narrower beam may provide greater precision for achieving a concentrated color change at a particular location on the reactive object. In another example, the attachment may widen the focus of the light beam(s) to a broader width for larger or more diffuse objects. A wider beam may provide a more even and consistent color change over a larger area of the reactive object.

In addition to the adjustable focus or zoom feature, the portable light source may also comprise an adjustable light output or intensity setting. The intensity setting (e.g., a dial, or an input to a touchscreen interface) may enable users to adjust the overall brightness of the LED and UV light emitted by the light sources. Adjusting the intensity of the light sources may provide more suitable light characteristics for different types of reactive objects (e.g., objects with varying shapes and sizes) and environments.

The portable light source may further comprise an attachment that implements a reflector (or other light directing device) to the light source(s). The reflector may be configured to reflects light in a specific direction, allowing to enable the light to be directed towards a particular area or object.

By adding a reflector to the portable light source, users may direct the LED and UV light towards the reactive objects, resulting in a more efficient and effective color change process. The reflector may be positioned and shaped in a variety of configurations to customize the light output of the portable light source for different types of objects and environments.

In some embodiments, the portable light source may comprise an attachment that implements a diffuser. The diffuser may be configured to soften and/or evenly distribute the light. Softening and/or evening out the distribution of light may prevent hotspots and providing a more even color change on the objects. A filter attachment may also be implemented. The filter may be configured to modify the color and/or intensity of the light.

In some embodiments, the portable light source may comprise a wireless communication device. The wireless communication device may enable communication with a remote device. The remote device may provide the user interface to enable users to provide settings. In an example, a third party app may be implemented by using Bluetooth or another wireless communication technology to establish a connection between the light source and the app. The connection may enable the app to communicate with the control system of the portable light source, allowing users to remotely control and customize the LED and UV light wavelengths used by the light source.

For example, the third party app may provide users with a variety of pre-set color schemes or lighting effects that may be selected from. The selection may be transmitted to the portable light source via the wireless connection. In some embodiments, users may also create custom color schemes and/or effects using the app, which may then be transmitted to the light source for use.

The third party app may enable the user to control and customize the LED and UV light wavelengths. The third party app may provide additional information and features related to the portable light source. For example, the app may display the current settings of the light source and/or provide tips and guidance for achieving specific aesthetic effects on photochromatic dye-coated objects. Integration of the portable light source with a third party app may provide users with enhanced control and flexibility in altering the color and appearance of photochromatic dye-coated objects, as well as additional information and features to assist in the color change process.

In some embodiments, the portable light source may comprise an attachment that provides a blinder. The blinder attachment may be configured to creates an enclosed environment around the light source. The blinder may comprise a light-tight material (e.g., a black fabric or plastic). The blinder may be configured to fit snugly around the light source.

By enclosing the light source in a blinder, a controlled environment for altering the aesthetics of photochromatic dye-coated objects may be created. The blinder may be configured to block out any external light sources and/or inhibit external light sources from reaching the object, allowing users to more accurately control the LED and UV light wavelengths used to change the color of the objects (e.g., prevent ambient light from affecting the color change process). The blinder attachment may be particularly useful in environments with a high level of ambient light and/or where the light source should be used in close proximity to the objects.

In addition to creating a controlled environment, the blinder may protect the light source from external elements (e.g., dust, moisture, etc.). The blinder may extend a lifespan of the light source and/or maintain the performance of the light source over time. The blinder attachment for the portable light source may provide additional control and/or protection in altering the aesthetics of the reactive objects.

In some embodiments, the portable light source may comprise a mounting system attachment. The mounting system (or station) may enable the portable light source to be securely attached to a fixed surface or object. The mounting system may be configured to provide an easily adjustable and flexible system for positioning the light source(s) in a variety of different locations and angles.

By attaching the portable light source to a mounting system or station, users may have a more comfortable and easy method of altering the aesthetics of photochromatic dye-coated objects. The mounting system may hold the light source in a fixed position, allowing users to have free hands to work and/or avoid potential strain associated with holding the light source in place. The mounting system may be particularly useful for extended use scenarios of the light source and/or for tasks that comprise precise control of the light wavelengths (e.g., for particular angles of light on the object).

The mounting system may enhance the performance of the portable light source by securing the light source in a specific location. Users may accurately direct the LED and UV light towards the photochromatic dye-coated objects, resulting in a more efficient and effective color change process. The use of a mounting system attachment may provide users with additional comfort, convenience, and performance when altering the aesthetics of photochromatic dye-coated objects.

In some embodiments, the portable light source may comprise an automated movement attachment. The automated movement attachment may be configured to automate a process of altering the aesthetics of the reactive objects (e.g., move the portable light source in a predefined pattern of movement in order to apply the light sources at particular locations of the reactive objects for predetermined amounts of time). In one example, the automated movement attachment may be a robotic arm. The robotic arm may be designed to hold and/or position the light source in a precise manner, allowing the portable light source to be automatically moved and oriented towards the objects.

By attaching the portable light source to a robotic arm, the process of changing the color of the reactive objects may be automated. The robotic arm may be programmed to move the light source(s) in a specific pattern and/or sequence to expose the reactive object(s) to the desired LED and UV light wavelengths in a controlled and repeatable manner. The robotic arm attachment may be useful for tasks that involve precise and consistent color changes on multiple objects (e.g., a production line).

The robotic arm may efficiently provide consistent and accurate results for applying the light sources. By accurately positioning and orienting the light source, users may direct the LED and UV light towards the reactive objects for designs with precision.

The portable light source may be configured to alter the aesthetics of photochromatic dye-coated objects. The portable light source may comprise a housing containing a power source, a LED light source, a UV light source and a control system. The control system may selectively activate and deactivate the LED and UV light sources and/or adjust the intensity of the light emitted. The LED light source may be capable of emitting visible light at a range of wavelengths, and the UV light source may be capable of emitting UV light at a range of wavelengths.

The portable light source of may further comprise a user interface for activating and deactivating the LED and UV light sources and for adjusting the intensity of the light. The portable light source may further comprise a display for displaying information about the current settings of the LED and UV light sources. The housing of the portable light source may be made of a durable material, such as plastic or metal. The power source may be a rechargeable battery. The power source may comprise an AC adapter. The portable light source may further comprise a clip and/or other attachment mechanism for attaching the portable light source to an object.

In some embodiments, the time taken to alter the aesthetics of the photochromatic dye-coated object using the portable light source may be dependent on the intensity and duration of the LED and UV light exposure, as well as the specific properties of the photochromatic dye used on the object. In some embodiments of the portable light source, the LED and UV light sources may be capable of emitting a wide range of wavelengths, allowing for a variety of aesthetic effects to be achieved on different types of photochromatic dye-coated objects. In some embodiments, portable light source may be small and lightweight, for easy portability and convenient to use.

In some embodiments, the portable light source may further comprise a wireless communication module for establishing a connection with a third party app. The third party app may comprise a user interface for activating and deactivating the LED and UV light sources and for adjusting the intensity of the light. The third party app may further comprise a display for displaying information about the current settings of the LED and UV light sources. In some embodiments, the wireless communication module may utilize Bluetooth and/or another wireless communication technology to establish the connection with the third party app. In some embodiments, the third party app may provide users with a variety of pre-set color schemes and/or lighting effects that may be transmitted to the portable light source via the wireless connection. In some embodiments, the third party app may allow users to create custom color schemes or lighting effects that may be transmitted to the portable light source via the wireless connection.

In some embodiments of the present invention, the portable light source may further comprise a reflector attached to the light source for directing the LED and UV light towards the objects. The LED light source may be capable of emitting visible light at a range of wavelengths, and the UV light source may be capable of emitting UV light at a range of wavelengths. In some embodiments, the portable light source may further comprise a diffuser attached to the light source for evenly distributing the LED and UV light. In some embodiments, the portable light source may further comprising a filter attached to the light source for modifying the color and/or intensity of the LED and UV light. In some embodiments of the present invention, the portable light source may further comprise a blinder attached to the light source for creating an enclosed environment around the light source. In some embodiments of the present invention, the portable light source may further comprise a mounting system or station attached to the light source for securing the light source to a fixed surface or object. In some embodiments of the present invention, the portable light source may further comprise a robotic arm and/or other automated mechanism attached to the light source for holding and positioning the light source in a precise manner.

In some embodiments, the apparatus may further comprise an adjustable focus and/or zoom feature for adjusting the width and/or intensity of the LED and UV light beams emitted by the light source. In some embodiments, the apparatus may further comprise an adjustable light output and/or intensity setting for adjusting the overall brightness of the LED and UV light emitted by the light source. The LED light source may be capable of emitting visible light at a range of wavelengths, and the UV light source may be capable of emitting UV light at a range of wavelengths. In some embodiments, the portable light source may further comprise a user interface for activating and deactivating the LED and UV light sources and for adjusting the intensity, focus, zoom, and light output or intensity of the light. In some embodiments, the portable light source may further comprise a display for displaying information about the current settings of the LED and UV light sources and the adjustable focus, zoom, and light output or intensity features. In some embodiments, the portable light source may further comprise a wireless communication module for establishing a connection with a third party app. In some embodiments, the portable light source may further comprise attachments such as a reflector, diffuser, filter, blinder, mounting system or station, and/or robotic arm or other automated mechanism. Various combinations of attachments and/or a single type of attachment may be implemented to assist in the application of the light sources to make the application of light a quicker and/or a more controlled process (e.g., a blinder or reflector that would prevent external light from interfering with the process or adding a surface to the source or object to speed up the process). Similarly, the attachment(s) may provide a practical solution for working on a larger object (e.g., a painting, a part of car, part of a sculpture, etc.).

In some embodiments, a method may comprise the steps of providing a portable light source comprising a housing that comprises a power source, a LED light source, a UV light source, and a control system. The steps may selectively activate and deactivate the LED and UV light sources and adjust the intensity of the light emitted. The steps may select a combination of LED and UV light wavelengths using the control system. The steps may expose a photochromatic dye-coated object to the selected combination of LED and UV light wavelengths using the portable light source. The steps may adjust the intensity of the LED and UV light wavelengths as desired using the control system. The steps may be repeated to achieve a desired aesthetic effect on the photochromatic dye-coated object.

In some embodiments of the method, a time to alter the aesthetics of a photochromatic dye-coated object using the portable light source may be dependent on an intensity and duration of the LED and UV light exposure, as well as the specific properties of the photochromatic dye used on the object. In some embodiments of the method, LED and UV light sources may be capable of emitting a wide range of wavelengths, allowing for a variety of aesthetic effects to be achieved on different types of photochromatic dye-coated objects.

In some embodiments of the method, a wireless communication module may establish a connection with a third party app and the steps may further comprise, establishing a connection between the portable light source and the third party app using the wireless communication module, selecting a combination of LED and UV light wavelengths using the third party app, transmitting the selected combination of LED and UV light wavelengths to the portable light source via the wireless connection, exposing a photochromatic dye-coated object to the selected combination of LED and UV light wavelengths using the portable light source, and adjusting the intensity of the LED and UV light wavelengths as desired using the third party app.

In some embodiments, the method may further comprise the steps of attaching a reflector, diffuser, filter, blinder, mounting system or station, and/or robotic arm or other automated mechanism to the light source to improve the efficiency and effectiveness of the light source, exposing a photochromatic dye-coated object to the LED and UV light emitted by the portable light source using the reflector, diffuser, filter, blinder, mounting system or station, and/or robotic arm or other automated mechanism, adjusting the intensity of the LED and UV light as desired using the control system, and repeating the steps as to achieve a desired aesthetic effect on the photochromatic dye-coated object.

In some embodiments, the method may further comprise the steps of adjusting the focus and/or zoom of the LED and UV light beams as needed to best suit the size and shape of the object, adjusting the light output or intensity of the LED and UV light to suit the environment and/or desired aesthetic effect, repeating steps to achieve a desired aesthetic effect on the photochromatic dye-coated object.

The functions performed by the diagrams of FIGS. 1-16 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s) The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. Execution of instructions contained in the computer product by the machine, may be executed on data stored on a storage medium and/or user input and/or in combination with a value generated using a random number generator implemented by the computer product. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. An apparatus comprising:
   a first light source configured to activate color channels of a reactive material in response to a signal;
   a second light source configured to deactivate a subset of said color channels of said reactive material in response to said signal;
   a controller configured to (i) receive an input, (ii) determine first characteristics for said first light source and second characteristics for said second light source in response to said input and (ii) generate said signal in response to said first characteristics and said second characteristics; and
   a power source configured to provide power for said first light source, said second light source and said controller, wherein
   (i) said reactive material is configured to change appearance in response to said subset of said color channels deactivated by said second light source,
   (ii) said power source and said controller are contained in a housing of said apparatus, and
   (iii) said first light source and said second light source enable said apparatus to emit light onto an object comprising said reactive material.

2. The apparatus according to claim 1, further comprising an attachment configured to connect said apparatus to a mounting device, wherein said mounting device is configured to position said apparatus to direct said first light source and said second light source at said object.

3. The apparatus according to claim 2, wherein said mounting device comprises a stand configured to fix a location and said position of said apparatus.

4. The apparatus according to claim 2, wherein said mounting device comprises (i) a holder configured to adjust said position of said apparatus and (ii) an arm configured to support said holder and enable an adjustment of a location of said apparatus.

5. The apparatus according to claim 4, wherein (i) said mounting device is configured to receive computer readable instructions and (ii) a configuration of said holder and said arm is controlled by said mounting device in response to executing said computer readable instructions.

6. The apparatus according to claim 1, wherein said housing is configured to be held by a person to enable said apparatus to be portable.

7. The apparatus according to claim 1, wherein (i) said light generated by said first light source has first wavelength in a ultraviolet light spectrum, (ii) said light generated by said second light source has a second wavelength in a visible light spectrum, (iii) said first wavelength and said second wavelength are selected in response to a desired aesthetic effect for said reactive material, (iv) said reactive material comprises a photochromatic dye and (v) said object is coated in said photochromatic dye.

8. The apparatus according to claim 1, further comprising an attachment configured to (i) connect to said apparatus, (ii) implement a reflector attached to one or more of said first light source and said second light source and (iii) direct at least one of said first light source and second light source towards said object.

9. The apparatus according to claim 1, wherein said first characteristics and second characteristics comprise (i) selective activation and deactivation, (ii) an adjustment of intensity and (iii) a selection of a wavelength for said first light source and said second light source.

10. The apparatus according to claim 1, wherein said input is received from a user interface.

11. The apparatus according to claim 10, wherein said user interface is implemented on said housing of said apparatus.

12. The apparatus according to claim 11, wherein (i) said user interface comprises a touchscreen display and (ii) said touchscreen display is configured to display information corresponding to said first characteristics of said first light source and said second characteristics of said second light source.

13. The apparatus according to claim 10, further comprising a wireless communication device configured to connect to a remote device, wherein (i) said user interface is implemented by said remote device and (ii) said remote device is configured to communicate said input received by said user interface to said apparatus using said wireless communication device.

14. The apparatus according to claim 1, wherein said power source comprises a rechargeable battery.

15. The apparatus according to claim 1, wherein said power source comprises an AC adapter.

16. The apparatus according to claim 1, further comprising a memory configured to store color schemes, wherein said color schemes define preconfigured settings for said first characteristics and said second characteristics.

17. The apparatus according to claim 1, further comprising a sensor configured to measure characteristics of ambient light in an environment, wherein said controller is further configured to (i) determine an amount of compensation for said first characteristics and said second characteristics in response to said characteristics of said ambient light measured and (ii) generate said signal in response to said compensation of said first characteristics and said second characteristics.

18. The apparatus according to claim 1, further comprising an attachment configured to (i) connect to said apparatus, (ii) implement a blinder for said first light source and said second light source and (iii) creating an enclosed environment around said first light source and said second light source that inhibits external light from reaching said object.

19. The apparatus according to claim 1, further comprising an attachment configured to (i) connect to said apparatus, (ii) implement a diffuser for at least one of said first light source and said second light source and (iii) distribute at least one of said first light source and said second light source evenly on said object.

20. The apparatus according to claim 1, further comprising an attachment configured to (i) connect to said apparatus, (ii) implement a filter for at least one of said first light source and said second light source and (iii) modify at least one of said first characteristics for said first light source and said second characteristics for said second light source.

* * * * *